(12) United States Patent　　　　(10) Patent No.:　US 12,578,038 B2

Lawrence et al.　　　　　　　　　　(45) **Date of Patent:　*Mar. 17, 2026**

---

(54) PIPING ARTICLES INCORPORATING AN ALLOY OF COPPER, ZINC, AND SILICON

(71) Applicant: NIBCO INC., Elkhart, IN (US)

(72) Inventors: Benjamin L. Lawrence, Elkhart, IN (US); Rudy L. Smith, Mission, TX (US); Wesley D. Coy, McAllen, TX (US); Kenneth Edgar McCoy, South Bend, IN (US); Todd Morehead, McAllen, TX (US)

(73) Assignee: NIBCO INC., Elkhart, IN (US)

( * ) Notice: Subject to any disclaimer, the term of this patent is extended or adjusted under 35 U.S.C. 154(b) by 880 days.

This patent is subject to a terminal disclaimer.

(21) Appl. No.: 17/500,662

(22) Filed: Oct. 13, 2021

(65) Prior Publication Data

US 2022/0034432 A1　　Feb. 3, 2022

Related U.S. Application Data

(63) Continuation-in-part of application No. 16/521,189, filed on Jul. 24, 2019, now Pat. No. 11,427,891.

(51) Int. Cl.
C22C 38/16　　　(2006.01)
C22C 9/04　　　(2006.01)
　　　(Continued)

(52) U.S. Cl.
CPC　F16L 9/02 (2013.01); C22C 9/04 (2013.01); C22C 38/16 (2013.01); F16L 13/02 (2013.01); F16L 13/08 (2013.01)

(58) Field of Classification Search
CPC ........................................................ C22C 9/04
See application file for complete search history.

(56) References Cited

U.S. PATENT DOCUMENTS 1,933,390 A　10/1933　Ray et al.
1,954,003 A　4/1934　Vaders
　　　(Continued)

FOREIGN PATENT DOCUMENTS

DE　　4324008 A1　1/1995
EP　　0274586 A1　7/1988
　　　(Continued)

OTHER PUBLICATIONS

C87440, Brasses (C83300-C89999), Application Datasheet—Standard Designation for Wrought Copper Alloys, Copper Development Association Inc., Revision date: Jun. 19, 2019, at 56, available at https://www.copper.org/resources/properties/db/datasheets/all-alloys.pdf.

(Continued)

*Primary Examiner* — Christopher S Kessler
(74) *Attorney, Agent, or Firm* — Price Heneveld LLP

(57)　　　　　ABSTRACT

A piping component that includes (i) a piping body with an open end; and (ii) an alloy comprising (by weight percentage) 12% to 16.5% zinc, 0.265% to 1.6% silicon and sufficient copper so that the sum of the weight percentages of the zinc, silicon, and copper in the alloy is at least 99.7%. The alloy exhibits an elongation that is within a range of 60% to 70%. Additionally discloses is a piping component including (i) a piping body with an open end; and (ii) a cold worked alloy comprising (by weight percentage) 12% to 16.5% zinc, 0.265% to 1.8% silicon and sufficient copper so that the sum of the weight percentages of the zinc, silicon, and copper in the alloy is at least 99.7%. In embodiments, the weight percentage of the silicon in the alloys disclosed can be 0.5% to 1.6%, 0.5% to 1.8%, or 0.5% to 2.0%.

8 Claims, 4 Drawing Sheets

(51) Int. Cl.

| | |
|---|---|
| *F16L 9/02* | (2006.01) |
| *F16L 13/02* | (2006.01) |
| *F16L 13/08* | (2006.01) |

(56) References Cited

U.S. PATENT DOCUMENTS

| | | | |
|---|---|---|---|
| 5,893,953 | A | 4/1999 | Bhargava |
| 6,413,330 | B1 | 7/2002 | Oishi |
| 7,354,489 | B2 | 4/2008 | Hofmann et al. |
| 7,628,872 | B2 | 12/2009 | Zhang et al. |
| 9,217,191 | B2 | 12/2015 | Gulbrandsen Dahl et al. |
| 9,951,400 | B1 | 4/2018 | McDevitt et al. |
| 2004/0234411 | A1 | 11/2004 | Hofmann et al. |
| 2004/0234412 | A1 | 11/2004 | Oishi et al. |
| 2008/0318079 | A1 | 12/2008 | Ballantyne et al. |
| 2009/0092517 | A1 | 4/2009 | Kosaka et al. |
| 2009/0280026 | A1 | 11/2009 | Strobl et al. |
| 2015/0376736 | A1 | 12/2015 | Schroeder et al. |
| 2016/0069483 | A1 | 3/2016 | Bobo et al. |
| 2016/0102385 | A1 | 4/2016 | Murray et al. |
| 2017/0145544 | A1 | 5/2017 | Lazarus |
| 2017/0204979 | A1 | 7/2017 | Yoder et al. |
| 2018/0148813 | A1 | 5/2018 | Yang et al. |

FOREIGN PATENT DOCUMENTS

| | | |
|---|---|---|
| GB | 1443090 | 7/1976 |
| JP | H0347932 A | 2/1991 |
| JP | H0368731 A | 3/1991 |
| JP | H04246141 A | 9/1992 |
| WO | 2011066581 A1 | 6/2011 |
| WO | 2017127284 A1 | 7/2017 |

OTHER PUBLICATIONS

Tyler et al.; Introduction to Copper and Copper Alloys; 1990, ASM; vol. 2; p. 216-240 (Year: 1990).

PIPING ARTICLES INCORPORATING AN ALLOY OF COPPER, ZINC, AND SILICON

CROSS-REFERENCE TO RELATED APPLICATION

This Application is a continuation-in-part of U.S. application Ser. No. 16/521,189, filed 24 Jul. 2019, now U.S. Pat. No. 11,427,891, issued 30 Aug. 2022, the entirety of which is incorporated herein by reference in its entirety.

BACKGROUND

Traditionally, copper piping components were connected together using thermal methods such as welding, soldering, and brazing. However, there is a consumer demand for non-thermal, mechanical deformation, connection methods, such as compression, press, push, and slip connection. However, heretofore, any particular copper piping component, depending on the specific alloy incorporated, could be connected using only thermal methods or only mechanical deformation methods, but not both—which limits the target market of the particular copper piping component and could result in the consumer attempting to utilize the less useful connection method.

SUMMARY

The present disclosure addresses that problem with a piping component made from an alloy comprising (by weight percentage) 12% to 16.5% zinc, 0.265% to 1.8% silicon and sufficient copper so that the sum of the weight percentages of the zinc, silicon, and copper in the alloy is at least 99.7%. The piping component made from such an alloy can exhibit high ductility, such as an elongation that is within a range of from 60% to 70%, making the piping component highly suitable for mechanical deformation connection methods. In addition, the piping component has a thermal conductivity making the piping component simultaneously highly suitable for thermal connection methods. Further, when the alloy has been cold worked, the piping component is very strong, such as exhibiting an ultimate tensile strength in excess of 340 MPa or even 750 MPa, while still retaining sufficient malleability to make the piping component simultaneously suitable for thermal connection and mechanical deformation connection methods, even where the piping component is to be used in a high wear environment.

According to a first aspect of the present disclosure, a piping component comprises: (i) a piping body with an open end; and (ii) a cold worked alloy comprising (by weight percentage) 12% to 16.5% zinc, 0.265% to 1.8% silicon and sufficient copper so that the sum of the weight percentages of the zinc, silicon, and copper in the alloy is at least 99.7%.

According to a second aspect of the present disclosure, the piping component of the first aspect is presented, wherein the open end is welded, soldered, or brazed to another piping component.

According to a third aspect of the present disclosure, the piping component of the first aspect is presented, wherein the open end is joined to another piping component via compression, press, push, or slip connection.

According to a fourth aspect of the present disclosure, the piping component of any one of the first through third aspects is presented, wherein the cold worked alloy exhibits: (i) an ultimate tensile strength within a range of 340 MPa to 550 MPa; (ii) a yield strength within a range of 275 MPa to 480 MPa; and (iii) an elongation within a range of 20% to 30%.

According to a fifth aspect of the present disclosure, the piping component of any one of the first through third aspects is presented, wherein the cold worked alloy exhibits: (i) an ultimate tensile strength within a range of 550 MPa to 750 MPa; (ii) a yield strength within a range of 480 MPa to 655 MPa; and (iii) an elongation within a range of 12% to 20%.

According to a sixth aspect of the present disclosure, the piping component of any one of the first through third aspects is presented, wherein the cold worked alloy exhibits: (i) an ultimate tensile strength within a range of 750 MPa to 900 MPa; (ii) a yield strength within a range of 655 MPa to 830 MPa; and (iii) an elongation within a range of 10% to 12%.

According to a seventh aspect of the present disclosure, the piping component of any one of the first through fourth aspects is presented, wherein the cold worked alloy was formed from a drawing of the alloy as-cast resulting in a diameter reduction within a range of 10% to 25%.

According to an eighth aspect of the present disclosure, the piping component of any one of the first through third and fifth aspects is presented, wherein the cold worked alloy was formed from a drawing of the alloy as-cast resulting in a diameter reduction within a range of 25% to 35%.

According to a ninth aspect of the present disclosure, the piping component of any one of the first through third and sixth aspects is presented, wherein the cold worked alloy was formed from a drawing of the alloy as-cast resulting in a diameter reduction within a range of 35% to 45%.

According to a tenth aspect of the present disclosure, the piping component of any one of the first through ninth aspects is presented, wherein the cold worked alloy comprises (by weight percentage) 15.5% to 16.0% zinc, 0.75% to 1.15% silicon, and 83% to 84% copper.

According to an eleventh aspect of the present disclosure, the piping component of any one of the first through tenth aspects is presented, wherein the cold worked alloy comprises (by weight percentage) greater than 15% zinc.

According to a twelfth aspect of the present disclosure, the piping component of any one of the first through fourth and seventh aspects is presented, wherein the cold worked alloy exhibits: (i) a Rockwell B hardness value within a range of 75 to 85; and (ii) an elongation within a range of 20% to 30%.

According to a thirteenth aspect of the present disclosure, the piping component of any one of the first through third, fifth, and eighth aspects is presented, wherein the cold worked alloy exhibits: (i) a Rockwell B hardness value within a range of 85 to 91; and (ii) an elongation within a range of 12% to 20%.

According to a fourteenth aspect of the present disclosure, the piping component of any one of the first through third, sixth, and ninth aspects is presented, wherein the cold worked alloy exhibits: (i) a Rockwell B hardness value within a range of 91 to 98; and (ii) an elongation within a range of 10% to 12%.

According to a fifteenth aspect of the present disclosure, a piping component comprises: (i) a piping body with an open end; and (ii) an alloy comprising (by weight percentage) 12% to 16.5% zinc, 0.465% to 1.6% silicon and sufficient copper so that the sum of the weight percentages of the zinc, silicon, and copper in the alloy is at least 99.7%, wherein, the alloy exhibits an elongation that is within a range of 60% to 70%.

According to a sixteenth aspect of the present disclosure, the piping component of the fifteenth aspect is presented, wherein the alloy comprises (by weight percentage) 82.5% to 86.8% copper and 0.7% to 1.25% silicon.

According to a seventeenth aspect of the present disclosure, the piping component of any one of the fifteenth through sixteenth aspects is presented, wherein the alloy comprises (by weight percentage) greater than 15% zinc.

According to an eighteenth aspect of the present disclosure, the piping component of any one of the fifteenth through seventeenth aspects is presented, wherein the piping component exhibits a DZ corrosion penetration depth of greater than 0 μm but less than 20 μm.

According to a nineteenth aspect of the present disclosure, the piping component of any one of the fifteenth through eighteenth aspects is presented, wherein the open end is joined to another piping article via welding, soldering, or brazing.

According to a twentieth aspect of the present disclosure, the piping component of any one of the fifteenth through eighteenth aspects is presented, wherein the open end is joined to another piping article via compression, press, push, or slip connection.

Another aspect of the disclosure is a piping article that includes a piping component including a piping body with an open end. The piping component is formed of an alloy comprising from about 12% to about 16% zinc, from about 0.5% to about 1.8% silicon, and a balance of copper (by weight). The alloy comprises an ultimate tensile strength of from about 200 N/mm² to about 300 N/mm², a yield strength of from about 75 N/mm² to about 225 N/mm², and an elongation of from about 15% to about 60%.

Another aspect of the disclosure is a piping article that includes a piping component including a piping body with an open end. The piping component is formed of an alloy consisting essentially of from about 12% to about 16% zinc, from about 0.5% to about 1.8% silicon, and a balance of copper (by weight). The alloy comprises an ultimate tensile strength of about 300 N/mm² or less, a yield strength of about 225 N/mm² or less, and an elongation of about 60% or less.

Another aspect of the disclosure is a piping article that includes a piping component including a piping body with an open end. The piping component is formed of an alloy consisting essentially of from 12% to 16% zinc, from 0.5% to 2% silicon, one or more of (i) from 0.02% to 0.09% phosphorous, (ii) from 0.02% to 0.09% arsenic, (iii) from 0.02% to 0.09% antimony, and (iv) from 0.05% to 0.2% iron, and a balance of copper (by weight). The alloy comprises an ultimate tensile strength of about 300 N/mm² or less, a yield strength of about 225 N/mm² or less, and an elongation of about 60% or less.

These and other features, advantages, and objects of the disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views may be shown exaggerated in scale or in schematic in the interest of clarity and conciseness.

In the drawings.

DETAILED DESCRIPTION

Figure 1:
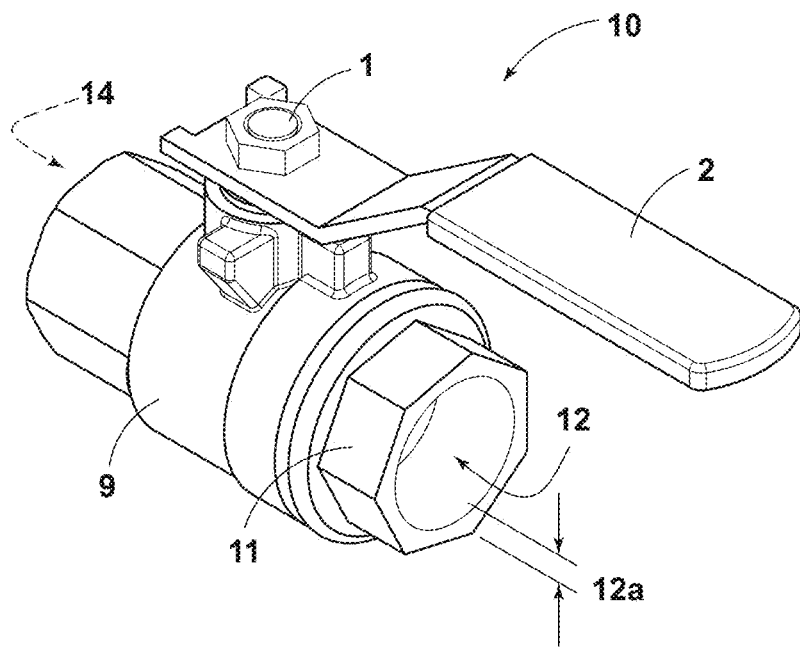
FIG. 1 is a perspective view of a valve assembly according to various examples.

For purposes of description herein, the aspects of this disclosure may assume various alternative orientations, except where expressly specified to the contrary. The specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Detailed examples of the present disclosure are disclosed herein. However, it is to be understood that the disclosed examples are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

It should also be understood that the term "fluids" as used herein includes steam, liquids, gasses, and other mixed or processed media.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

Figure 2:
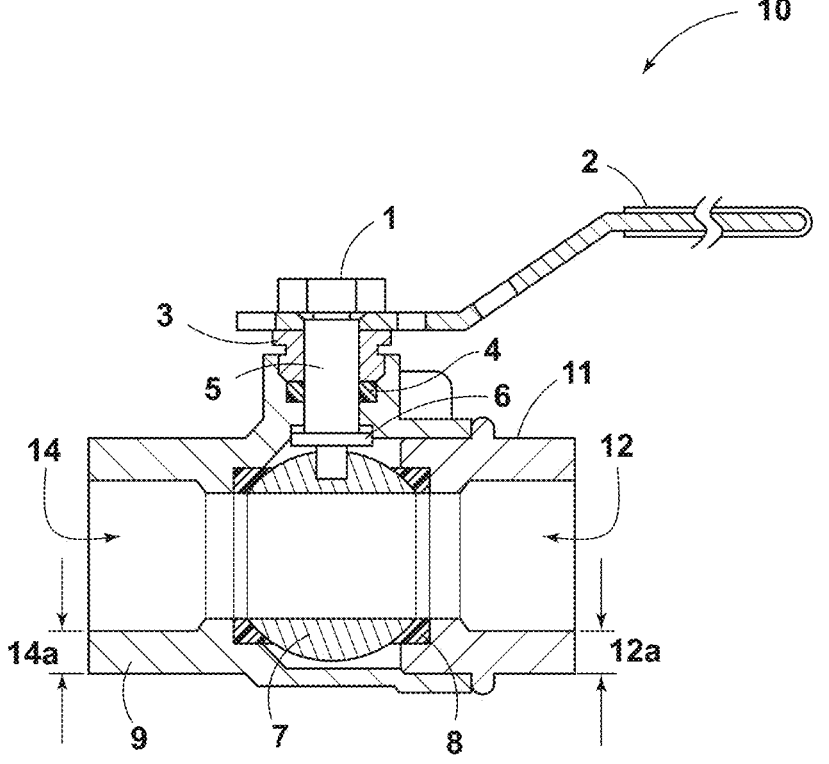
FIG. 2 is a side, cross-sectional view of the valve assembly of FIG. 1.

Referring to FIGS. 1 and 2, a valve assembly 10 for controlling the flow of fluids is depicted according to one aspect of the disclosure. As depicted, the valve assembly 10 may include standard valve components including, but not limited to, a handle nut 1, a handle 2, a threaded pack gland 3, a packing 4, a stem 5, a thrust washer 6, a vented ball 7 and a seat ring 8. These components are conventionally arranged within the valve assembly 10. Further, these components function as known in the field of this disclosure.

In addition, the valve assembly 10 may include a valve body 9 and an end piece 11. As shown in FIGS. 1 and 2, the inlet end 12 of the valve assembly 10 is located within the end piece 11. The outlet end 14 of the valve assembly 10 is located within the valve body 9. The valve assembly 10 may control and restrict the flow of fluid from the inlet end 12 to the outlet end 14. For example, the handle 2 may be operatively connected to the ball 7 and, accordingly, an operator may rotate the handle 2 to move the ball 7 to a position in which the ball 7 blocks the flow of fluid from the inlet end 12 to the outlet end 14. Similarly, an operator can rotate the handle 2 to another position to move the ball 7 to a position in which the ball 7 does not block the flow of fluid from the inlet end 12 to the outlet end 14.

The valve body 9, the end piece 11, and other components of the valve assembly 10 may be formed from a low silicon copper alloy described herein which allows the components to be fabricated using one of multiple production methods, including thermal and mechanical deformation methods. The fabrication of certain components of the valve assembly 10 from a low silicon copper alloy, as described herein, facilitates the formation of the valve assembly 10 by multiple production methods and the use of the valve assembly 10 with multiple joinery methods and/or in multiple service applications. The wall thickness 12a (at the inlet end 12) and the wall thickness 14a (at the outlet end 14) of the valve assembly 10 may be modified during production, and each end 12, 14 may include tapered ends, grooves, stops, or other features to further facilitate one or multiple joinery methods. Further, a gripper ring (not shown) may be included within one or both of the inlet end 12 and the outlet end 14, depending on the selected joinery method used with the valve assembly 10. Other components of the valve assembly 10 in contact with the fluids at the operating temperatures and pressures, e.g., the ball 7, may also be fabricated from the disclosed low silicon copper alloys.

In embodiments, the low silicon copper alloys used to fabricate the components of the valve assembly 10 and other piping components, such as those mentioned herein, comprise (by weight percentage) 12% to 16.5% zinc, 0.265% to 1.8% silicon and sufficient copper so that the sum of the weight percentages of the zinc, silicon, and copper in the alloy is at least 99.7%. In some examples, the low silicon copper alloys used to fabricate the components of the valve assembly 10 may be a low silicon copper alloy comprising from about 12% to about 16% zinc, from about 0.5% to about 1.8% silicon, and a balance of copper (by weight). In other examples, the low silicon copper alloy may comprise from about 12% to about 16% zinc, from about 0.5% to about 2% silicon, one or more of (i) from about 0.02% to about 0.09% phosphorous, (ii) from about 0.02% to about 0.09% arsenic, (iii) from about 0.02% to about 0.09% antimony, and (iv) from about 0.05% to about 0.2% iron, and a balance of copper (by weight). Other elements such as a lead, aluminum, tin, and/or manganese may be added in low concentrations (less than 0.1% by weight). Additional trace elements may also be present in the low silicon copper alloy.

Specifically, in some examples, the low silicon copper alloys may have a composition consisting essentially of from about 12% to about 16% zinc, from about 0.5% to about 1.8% silicon, and a balance of copper (by weight). In other examples, the low silicon copper alloy may have a composition consisting essentially of from about 12% to about 16% zinc, from about 0.5% to about 2.0% silicon, less than about 0.09% lead, less than about 0.09% aluminum, and a minimum of about 80% copper (by weight). In another example, the low silicon copper alloy may have a composition consisting essentially of from about 12% to about 16% zinc, from about 0.5% to about 2.0% silicon, equal to or less than about 0.20% iron, low, or trace concentrations of one or more of phosphorus, arsenic, antimony, lead, aluminum, tin, manganese, and nickel, and a balance of copper (by weight). In yet another example, the low silicon copper alloy may have a composition consisting essentially of from about 14% to about 16% zinc, from about 0.5% to about 1.0% silicon, from about 0.10% to about 0.20% iron, less than about 0.02% of one or more of phosphorus, arsenic, antimony, lead, aluminum, tin, manganese, and nickel, and a balance of copper (by weight). In another example, the low silicon copper alloy may have a composition consisting essentially of 12% to 14% zinc, 0.5% to 1.0% silicon, less than 0.10% iron, less than 0.02% of one or more of phosphorus, arsenic, antimony, lead, aluminum, tin, manganese, and nickel, independently, and a balance of copper (by weight). In embodiments, the low silicon copper alloy comprises (by weight percentage), 12% to 16% zinc, 82.5% to 86.8% copper and 0.7% to 1.25% silicon. In embodiments, the low silicon copper alloy comprises (by weight percentage), 12% to 16.5% zinc, 0.265% to 1.8% silicon (such as 0.265%, 0.3%, 0.4%, 0.465%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, or 2.0% silicon, or any weight percentage silicon within a range bounded by any two of those values), and sufficient copper so that the sum of the weight percentages of the zinc, silicon, and copper in the alloy is at least 99.7%.

In embodiments, the low silicon copper alloy has a composition comprising (by weight percentage) 15.5% to 16.0% zinc, 0.75% to 1.15% silicon, and 83% to 84% copper. In embodiments, the low silicon copper alloy has a composition (by weight percentage) greater than 15% zinc (e.g., 15.1%, 15.2%, 15.3%, 15.4%, 15.5%, 15.6%, 15.7%, 15.8%, 15.9%, or 16.0%, or within any round bounded by any two of those values, e.g., 15.5% to 16.0%, 15.2% to 15.9%, and so on).

The low silicon copper alloys used for fabricating the valve assembly 10 and having the above-referenced compositions may exhibit specific mechanical and thermal properties. Specifically, for example, the low silicon copper alloys may exhibit mechanical properties such as an ultimate tensile strength of about 300 N/mm$^2$ or less, a yield strength of about 225 N/mm$^2$ or less, and an elongation of about 55% or less. Further, as another example, the low silicon copper alloy may have an ultimate tensile strength of about 200

N/mm$^2$ to about 300 N/mm$^2$, a yield strength of about 75 N/mm$^2$ to about 225 N/mm$^2$, and an elongation of about 15% to about 55%. In yet another example, the low silicon copper alloy may have an ultimate tensile strength of about 150 N/mm$^2$ to about 300 N/mm$^2$, a yield strength of about 50 N/mm$^2$ to about 225 N/mm$^2$, and an elongation of about 15% to about 40%. In another example, the low silicon copper alloy may have an ultimate tensile strength of about 200 N/mm$^2$ to about 300 N/mm$^2$, a yield strength of about 75 N/mm$^2$ to about 225 N/mm$^2$, and an elongation of about 15% to about 35%. Further, the low silicon copper alloy used for fabricating the valve assembly 10 may exhibit a thermal conductivity of about 45 W/m·K to about 70 W/m·K. In embodiments, the alloy exhibits an elongation that is within a range of from 60% to 70%, such as 60%, 61%, 62%, 63%, 64%, 65%, 66%, 67%, 68%, 69%, or 70%, or within any range bounded by any two of those values (e.g., 61% to 68%, 62% to 69%, and so on).

The low silicon copper alloys, along with the valve assembly 10 and other piping components of the disclosure made from the low silicon copper alloys, result in the foregoing thermal and mechanical properties, which can enable the use of multiple joinery methods and fabrication methods. In contrast, conventional alloys, and the piping components made from conventional alloys, have mechanical and thermal properties suitable for one or only a few related joinery methods (e.g., brazing, welding, and soldering), making them more costly to use and less desirable for consumers and technicians.

Table 1 below illustrates exemplary selected ranges for the composition of the low silicon copper alloys disclosed herein. The use of a low silicon copper alloy with the composition detailed below in Table 1, as having the mechanical and thermal properties previously discussed, enables the valve assembly 10 to be fabricated using multiple fabrication methods. Likewise, the fabrication of the valve assembly 10 using the low silicon copper alloys of the disclosure enables the valve assembly 10 to be joined to other components with multiple joinery methods. Further, the alloys of the disclosure can result in the compatibility of the valve assembly 10 (and other piping components fabricated from these alloys) in multiple service applications.

TABLE 1

| Element | Content (by weight percentage) |
| --- | --- |
| Zinc | 12%-16.5% |
| Silicon | 0.265%-2.0% |
| Phosphorous | 0.02%-0.09% |
| Arsenic | 0.02%-0.09% |
| Antimony | 0.02%-0.09% |
| Iron | 0.05%-0.20% |
| Lead | ≤0.1% |
| Aluminum | ≤0.1% |
| Tin | ≤0.1% |
| Manganese | ≤0.1% |
| Nickel | ≤0.1% |

With respect to the fabrication of piping components from the disclosed low silicon copper alloys, the composition detailed above in Table 1 allows the low silicon copper alloys to exhibit the necessary mechanical and thermal properties that enable the resulting piping components to be fabricated using multiple methods such as, for example, casting, forging, extrusion, or machining. Specifically, individual elements of the composition may provide certain properties for facilitating the multiple production methods, as discussed in detail below.

For example, maintaining levels of zinc above about 12% by weight, as specified in Table 1, ensures that the disclosed low silicon copper alloys are forgeable. However, the levels of zinc and silicon in the disclosed low silicon copper alloys are low enough (i.e., at or less than about 16% or 16.5% zinc, and less than about 2% silicon, respectively), so as to remain in solid solution within a single alpha phase. Within the alpha phase of the low silicon copper alloys, the cored dendritic structure allows for a segregation of alloying elements, including zinc and silicon. The concentration of these elements varies from zero at the dendrite center to a maximum along the dendrite outer edge. Upon forging, the dendritic structure is broken down, resulting in an equiaxed grain structure of alpha copper solid solution, free of alloying element segregation.

Generally, dendritic zinc segregation within pre-forged alloys aids forging, increasing hot workability as the level of zinc increases. The low silicon copper alloys of the disclosure include a relatively high level of zinc (e.g., up to about 16% or 16.5%) to take full advantage of dendritic zinc segregation within the low silicon copper alloys with respect to forging without promoting an amount of segregate that creates an issue with dezincification corrosion that cannot be addressed though addition of other elements (phosphorous, arsenic, antimony, iron, lead, aluminum, tin, manganese, nickel). In contrast, dendritic segregation of silicon throughout a pre-forged alloy may create areas of local restriction to forging by decreasing hot workability. The level of silicon (e.g., at or below 2% by weight) of the low silicon copper alloys of the disclosure limits silicon to a level that prevents the silicon from decreasing the hot workability of the forged alloy. Maintaining levels at or below 2% by weight of silicon also ensures that the hot metal is able to flow with greater ease within a die, reducing die wear and increasing overall forgeability of the low silicon copper alloys.

With respect to at least casting, the addition of silicon to a low target level within the low silicon copper alloys of the disclosure results in a high metal fluidity, as discussed above with reference to the die for forging. The high metal fluidity enables the disclosed low silicon copper alloys to also flow readily into a mold for casting fabrication. However, a higher level of silicon may also cause high levels of alloy gassing that may cause casting porosity. Maintaining silicon levels at or below about 2% by weight, as detailed in Table 1 with reference to the disclosed low silicon copper alloys, reduces the amount of silicon available to react with oxygen during casting and reduces the formation of silicon oxides and gassing, which may prevent problems caused by casting porosity. The level of zinc within the disclosed range of Table 1 (e.g., from about 12% to about 16% or 16.5% by weight) aids in the dampening of alloy gassing, particularly of silicon, thus increasing casting quality. The level of zinc as disclosed also ensures that piping components cast from the low silicon copper alloys of the disclosure do not suffer an appreciable loss in strength during fabrication.

With respect to at least machining, the levels of silicon within a range of from about 0.265% to about 2.0% by weight and the levels of zinc within a range of from about 12% to about 16.5% by weight, as disclosed in Table 1 above, provide the low silicon copper alloys with a strength that is low enough so that the disclosed alloys are also machinable. Specifically, because of the disclosed levels of zinc and silicon, the low silicon copper alloys include a greater concentration of zinc and silicon along structural dendritic boundaries within the alloy, as discussed above with respect to forging. The greater concentrations of silicon and zinc along the structural dendritic boundaries act as effective chip breakers to facilitate machining. Further, because the levels of silicon are at or below about 2% by weight, any negative effects on machine tools caused by silicon being a hard microstructural constituent may be mitigated by the disclosed silicon content when machining piping components fabricated from the disclosed low silicon copper alloys.

Fabrication of piping components from the disclosed low silicon copper alloys, as detailed above in Table 1, by any one of the fabrication methods discussed herein, or by other methods not specifically addressed, allows the resulting piping components to exhibit the necessary mechanical and thermal properties to be used in multiple joinery methods such as, for example, soldering, brazing, welding, press connections, threading, compression connections, and/or slip connections. Generally, many joinery methods require a range of mechanical and thermal properties for proper application. The disclosed alloy compositions provide the necessary properties for compatibility of piping components fabricated from these alloys with multiple joinery methods, as discussed in detail below.

For example, with respect to at least soldering, an alloy that possesses a reasonably high thermal conductivity is preferred for a solder connection. For example, high silicon alloys (e.g., a C87850 alloy, a C87600 alloy, and/or a C87850 alloy) are traditionally used in soldering for their thermal conductivity properties. The silicon level (e.g., 0.265% to 2.0% silicon by weight, as detailed in Table 1 above) of the disclosed low silicon copper alloys is lower than the silicon levels (i.e., 2.5% to 5.0% silicon by weight) of the high silicon alternatives. The lower silicon level of the disclosed low silicon copper alloys produces a thermal conductivity that is higher than the thermal conductivity of the high silicon alternatives, allowing heat to be transferred more easily and uniformly throughout the solder joint. Further, the silicon of the high silicon alternatives tends to transform into a deleterious surface layer of silicon oxide upon exposure to high temperatures and air. This layer is not easily removed by fluxes and may promote a barrier that impedes the ability of the solder to wet the joint surface and flow into the joint gap. The lower silicon level of the low silicon copper alloys as compared to the high silicon alternatives reduces the formation of the silicon oxide. Good heat flow due to the high thermal conductivity of the low silicon copper alloys also allows a flux that is applied to the joint prior to soldering to be uniformly activated without areas of burning. The activation can at least partially remove the silicon oxide from the mating pieces of the piping components, preventing the oxides from interfering with surface wetting and capillary flow of solder within the joint gap. Thus, piping components fabricated from the disclosed low silicon copper alloys may be joined by soldering, and the reduced formation of silicon oxide may even improve solderability of the disclosed low silicon copper alloys as compared to the traditionally used high silicon alternatives.

With respect at least to welding and brazing, variations between the melting point of copper and the boiling point of added elements in a copper-based alloy may impact the strength of said alloy. For example, elemental zinc has a boiling point of about 1,665° F. which is below the melting point of copper (typically between 1,800° F. and about 1,990° F.). This difference causes zinc to evaporate, or vaporize, during welding or brazing of a copper-based alloy including zinc. Zinc vaporization may cause gas-hole defects in the copper-based alloy if too much zinc is added, which may negatively impact the structural soundness of the weld. Reduction in mechanical strength due to zinc vaporization and resulting gas-hole defects may also cause affected components to distort under the weight of joinery members, particularly when considering installation brazing of large diameter piping components.

However, the zinc content (i.e., 12% to 16.5% zinc by weight) of the low silicon copper alloys disclosed above in Table 1 is low enough to prevent detrimental amounts of zinc vaporization within the heat affected zone (HAZ) during at least brazing or welding. Further, the low silicon level (i.e., about 0.265% to about 2.0% silicon by weight) of the disclosed low silicon copper alloys increases thermal conductivity of the disclosed alloys, as discussed previously. This increased thermal conductivity results in more even heating of the disclosed alloys and a reduction of the tendency of the disclosed alloys to develop high localized heating of the weldment as compared to typical copper-based alloys. The reduced localized heating prevents development of hot spots that may be more susceptible to zinc vaporization, further limiting zinc vaporization within the disclosed alloys during brazing or welding. While some zinc may be lost from the disclosed alloys during joinery, due to the limited zinc vaporization as a result of the disclosed levels of silicon and zinc in Table 1, the low silicon copper alloys remain stable without appreciable loss of mechanical strength, distortion of the joinery members, and/or other structural change due to zinc vaporization. For example, when a disclosed low silicon copper alloy that includes a maximum weight percentage of zinc of about 16% or 16.5%, the limited amount of zinc and added resistance from the disclosed content of silicon together limit zinc vaporization to a level that reduces the zinc content to only about 15% when brazed or welded. This low amount of reduction also improves corrosion resistance and dezincification resistance, particularly in combination with the inherent post-weld rapid cooling. Thus, piping components fabricated from the disclosed low silicon copper alloys may also be joined by brazing or welding and, when brazed or welded, may even exhibit an increased resistance to corrosion and dezincification as compared to typical copper-based alloys.

With respect to at least press connections, traditional press articles are fabricated from copper tube (e.g., a C12200 alloy) that is in a light drawn or annealed condition. The traditional copper tube is selected to achieve the ductility and mechanical strengths necessary to allow the press articles to be deformed or pressed to provide a suitable mechanical attachment while still maintaining adequate mechanical and structural integrity after being pressed. The low silicon copper alloys of the disclosure are characterized by similar mechanical properties, including ductility (measured by percent elongation) and yield strength, and may be used to fabricate press articles in place of the copper tube alternative. By limiting the zinc content to less than about 16.0% or 16.5% by weight, as disclosed in Table 1 above, the disclosed low silicon copper alloys maintain the ductility necessary for press connections without being susceptible to cracking during pressing. The lower silicon also facilitates the necessary ductility for press connections and/or other cold deformation joinery methods. Specifically, the high elongation (up to about 60% or even up to about 70%) exceeds the ductility of even a C12200 soft grain alloy (up to about 45%), as discussed elsewhere herein. The yield strength (about 225 N/mm$^2$ or less) is comparable to the yield strength of a light drawn C 12200 alloy (about 221 N/mm$^2$) and is thus low enough to facilitate press and other mechanical deformation joinery processes of the piping components, as discussed elsewhere herein.

With respect to at least cross-linked polyethylene (PEX) connections and other push connection fittings that utilize barbs to grip an interior of a received tube to maintain the connection, the disclosed low silicon copper alloys provide beneficial levels of corrosion resistance and high machinability, as discussed previously. For these connections, the sharp barbed connection end must be formed within the piping component. The barbed connection end is fitted within the mated plastic tubing and is fully exposed to the system media. This requires the alloy of the piping component to be resistant to corrosion. As discussed above, the low susceptibility of the disclosed alloys to dezincification increases the corresponding resistance to corrosion. Specifically, by maintaining a limited concentration of silicon (at or below about 2% by weight, as disclosed in Table 1) and a zinc concentration below about 16% or 16.5% by weight, the compositions of the low silicon copper alloys as disclosed provide resistance to dezincification corrosion, as discussed above, and to other forms of de-alloying corrosion.

For use with PEX connections and push connections, the disclosed low silicon copper alloys must also allow for the barbs of the barbed end to be sharp enough to dig into the plastic tubing. The disclosed alloys are machinable and therefore allow formation of said barbs. The alloys of the disclosure also exhibit high mechanical strengths which are necessary to hold up to the force of crimping metallic rings when connecting the piping component with the outer plastic tube. Thus, the disclosed low silicon copper alloys may be used for PEX connection and push connection piping components as the disclosed alloys provide the necessary corrosion resistance, machinability, and mechanical strengths necessary for these connection types in addition to exhibiting the necessary properties for the multiple other connection types discussed previously.

With respect to service, the previously discussed resistance of the disclosed alloys to de-alloying corrosion and/or dezincification allows the piping components formed of these disclosed alloys to be used in a wide range of applications. For example, the piping components may be used in applications that may include water with high levels of oxygen, slow-moving water, soft water, and other fluids that may react with zinc. However, while the addition of silicon may increase corrosion resistance, the addition of silicon may also result in an increase in mechanical strengths. The resulting strength enhancement may limit the useful application and/or performance of the product. As such, the disclosed low silicon copper alloys have silicon added in a limited concentration (at or below 2% by weight) to provide the increased corrosion resistance while maintaining the necessary mechanical strengths for the multiple fabrication and joinery methods. In embodiments, piping components comprising the alloys described herein exhibit a dezincification (DZ) corrosion penetration depth of 0 μm, or greater than 0 μm but less than 20 μm.

According to various embodiments, while the contents of zinc and silicon in the disclosed alloys provide many of the properties necessary for the use of multiple fabrication and joinery methods in the same component, the addition of other elements (e.g., phosphorous, arsenic, antimony, iron, lead, aluminum, tin, manganese, or nickel), as detailed above in Table 1 with regard to the disclosed low silicon copper alloys, can also play an important role in achieving the properties discussed above. In various examples, these elements may be trace elements within the disclosed alloy. In other examples, these elements may be added to further achieve the specified mechanical properties of the disclosed low silicon copper alloys in particular cases, as discussed below.

Phosphorous, for example, may be used as a grain refiner for cast copper base alloys where clay bonded sand molds are used for casting. Clay bonded sand molds provide alloys a more gradual cooling rate from a molten state to a solid state than is provided by permanent metal molds or forging methods. The slower cooling allows more time for larger grain growth. The use of phosphorous in the disclosed low silicon copper alloys as laid out in Table 1 creates points of grain initiation through the alloy matrix, refining the structural grains and resulting in higher strengths for the disclosed alloys. This contributes to making the disclosed alloys suitable for casting piping components of the disclosed alloys and for using said piping components with multiple joinery methods.

As another example, while iron has not been widely recognized as a grain refiner for copper based alloys, the addition of iron has been shown to provide grain refining benefits, including enhancing mechanical strength, without negatively impacting the basic benefits for the respective copper based alloy. With respect to the disclosed alloys, maintaining iron at less than 0.20% by weight, as shown in Table 1 above, provides increased mechanical strength through grain refinement without significantly impairing other performance outcomes. For example, while the iron content of the disclosed alloys promotes high mechanical strength, maintaining the iron content at less than 0.20% by weight allows the disclosed alloys to also maintain the necessary thermal conductivity for welding, soldering, and brazing, as discussed above.

In other examples, lead has a low melting point, 621.4° F. which allows for significant reductions and a near-elimination of the lead content in the disclosed low silicon copper alloys further facilitates the use of the disclosed alloys with brazing and/or soldering joinery methods. The lead content of the disclosed alloys also provides the mechanical strengths necessary for fabricating piping components of the disclosed alloys using machining and further facilitates using the disclosed alloys with press, push, or other deformation joinery methods. Specifically, because the lead content of the disclosed alloys is maintained at less than 0.09% by weight, as shown in Table 1 above, the disclosed alloys do not have an interruptive phase that is vulnerable to cracking when mechanically deformed.

Further, arsenic, antimony, phosphorous, iron, or any combination thereof may be included in the composition of the disclosed alloys, as detailed in Table 1, for enhancing the corrosion resistance of the low silicon copper alloy. In still other examples, with respect to mechanical strength of the disclosed alloys, aluminum, tin, manganese, and nickel may be used in the compositions of Table 1 to increase the mechanical strengths of the disclosed low silicon copper alloys. In order to maintain the lower strengths needed to facilitate press connections and other deformation joinery methods, the content of aluminum, tin, manganese, and nickel of the disclosed alloys is limited to a maximum of 0.03% by weight. In yet other examples, the addition of nickel may increase the stability of the alloy in high temperature service. Lead, aluminum, tin, and/or manganese may also be added to the disclosed low silicon copper alloys to allow utilization of lower cost scrap streams without negatively impacting the properties necessary for using the disclosed low silicon copper alloy with the multiple fabrication and joinery methods.

Figure 3:
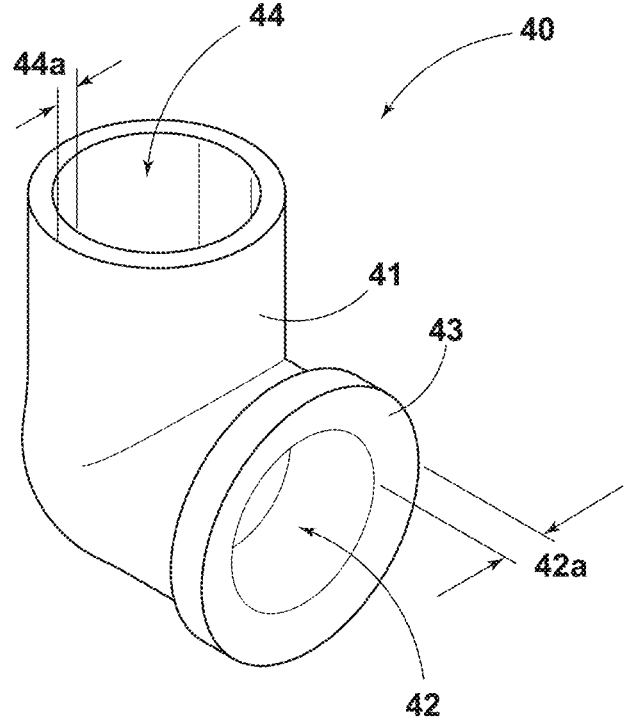
FIG. 3 is a perspective view of a piping component according to various examples.
Figure 4:
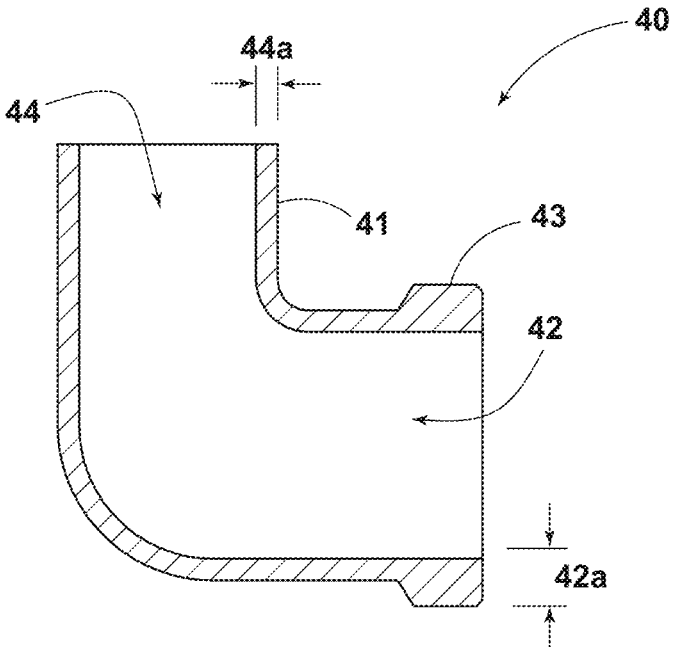
FIG. 4 is a side, cross-sectional view of the piping component of FIG. 3.

For the reasons set forth above, the use of the disclosed low silicon copper alloys detailed in Table 1 above for valve assembly 10 and other piping components is advantageous for using multiple fabrication and joinery methods with a single piping component. These alloys may also provide additional benefits with respect to one or more fabrication and joinery methods. For example, the disclosed alloys may be used to fabricate the elbow fitting 40 shown in FIGS. 3 and 4. As depicted according to some aspects of the disclosure, the elbow fitting 40 may include standard features of an elbow fitting including, but not limited to, an elbow body 41, inlet 42, flange 43 and outlet 44. These features are conventionally arranged within the elbow fitting 40 and generally function as known in the field. For example, the inlet end 42 and the outlet end 44 of the body 41 allow the elbow fitting 40 to control the flow of fluid from the inlet end 42 to the outlet end 44. Further, the wall thickness 42a (at the inlet end 42) and the wall thickness 44a (at the outlet end 44) of the elbow body 41 may be modified during fabrication, and the ends 42, 44 may be configured to include tapered ends, grooves, stops, or other features to further facilitate use of the elbow fitting 40 with one or multiple joinery methods. In various examples, the inlet end 42 and the outlet end 44 may include threading for joinery methods. In other examples, the inlet end 42 and the outlet end 44 may be unthreaded. In still other examples, the inlet end 42 and the outlet end 44 may have teeth or barbs positioned to facilitate gripping of a pipe when the pipe is received by the elbow fitting 40.

All of the features and components of the elbow fitting 40 including, but not limited to, the body 41 and the flange 43 may be fabricated from the disclosed low silicon copper alloys using multiple fabrication methods discussed above. The use of the disclosed low silicon copper alloys for fabricating the elbow fitting 40 gives the elbow fitting 40 the capability to be used with one or multiple joinery methods and in one or multiple service applications, as previously discussed.

Figure 5:
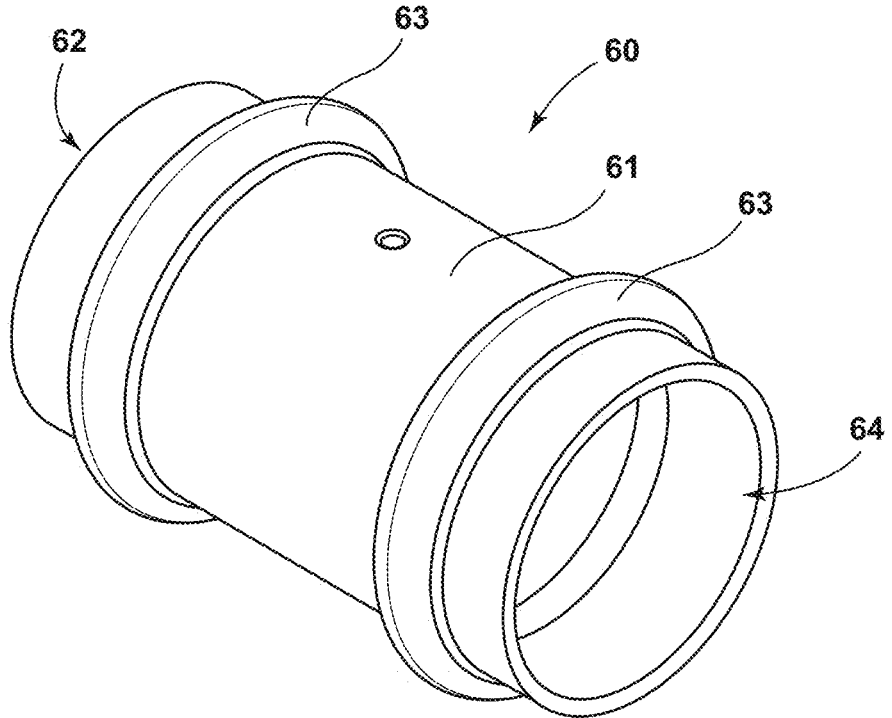
FIG. 5 is a perspective view of a piping component according to various examples.
Figure 6:
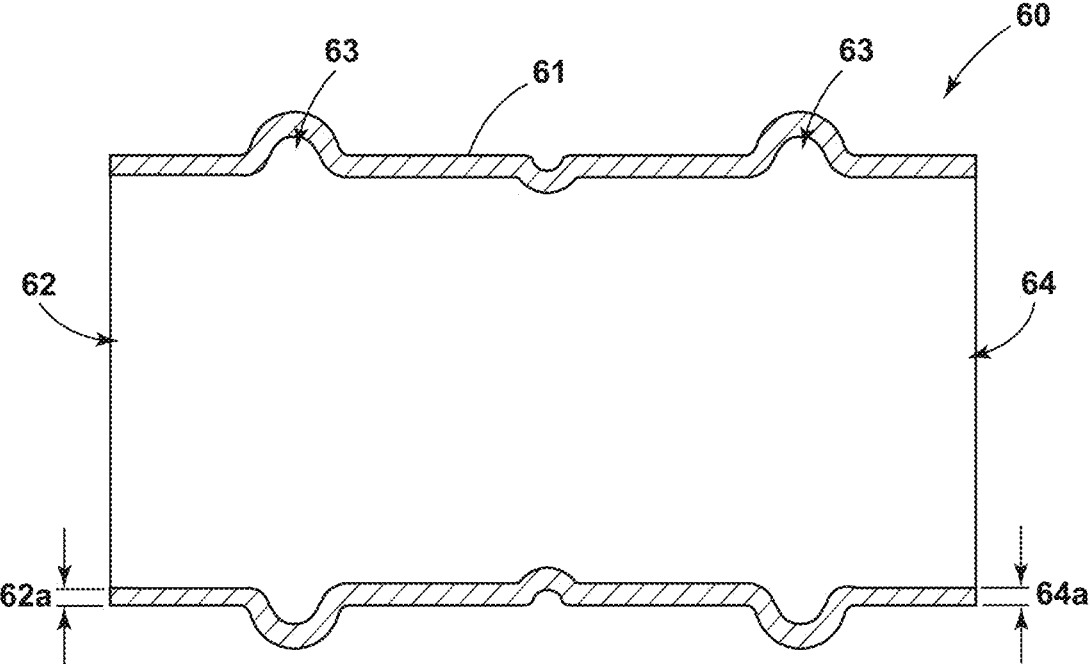
FIG. 6 is a side, cross-sectional view of the piping component of FIG. 5.

Referring to FIGS. 5 and 6, other piping components, such as the depicted coupler 60, may also be fabricated from the disclosed low silicon copper alloys according to further aspects of the disclosure. As depicted, the coupler 60 may include standard features of a coupler 60 including, but not limited to, a piping body 61, an inlet end 62, a sealing recesses 63 and an outlet end 64. According to various examples, a seal (not shown) may be positioned within one or more of the sealing recesses 63. These features are conventionally arranged within the coupler 60 and generally function as known in the field. For example, the inlet end 62 and the outlet end 64 of the piping body 61 allow the press fitting 60 to control the flow of fluid from the inlet end 62 to the outlet end 64. Further, the wall thickness 62a (at the inlet end 62) and the wall thickness 64a (at the outlet end 64) of the piping body 61 may be modified during fabrication, and further the ends 62, 64 may include tapered ends, grooves, stops, or other features to further facilitate use of the coupler 60 with one or multiple joinery methods. In various examples, the inlet end 62 and the outlet end 64 may include threading for joinery methods. In other examples, the inlet end 62 and the outlet end 64 may be unthreaded. In still other examples, the inlet end 62 and the outlet end 64 may have teeth or barbs positioned to facilitate gripping of a pipe when the pipe is received by the coupler 60.

All of the features and components of the coupler 60 including, but not limited to, the piping body 61, inlet end 62, sealing recesses 63 and outlet end 64 may be fabricated from the disclosed low silicon copper alloys using multiple fabrication methods discussed above. The use of the disclosed low silicon copper alloys for fabricating the coupler 60 gives the coupler 60 the capability to be used with one or multiple joinery methods and in one or multiple service applications, as previously discussed.

It should be understood that the valve assembly 10, the elbow fitting 40, and the coupler 60, aspects of the disclosure depicted in FIGS. 1-6 are merely exemplary piping components. Other piping components may be fabricated from the disclosed low silicon copper alloys using one or multiple fabrication methods as discussed above to allow the piping components to be joined using one or multiple of the joinery methods and used in one or multiple service applications, as previously discussed in relation to the ball valve assembly 10, elbow fitting 40, and coupler 60. For example, piping components with at least one open end that are designed to be joined with a pipe, such as connection ends, construction bodies, flow control members, and/or article accessories may be fabricated using the disclosed low silicon copper alloys. The valve body 9, the elbow body 41, and the piping body 61 are examples of a "piping body" as used herein. The inlet end 12 and the outlet end 14 of the valve assembly 10, the inlet end 42 and the outlet end 44 of the elbow fitting 40, and the inlet end 62 and the outlet end 64 of the coupler 60 are examples of "an open end" of a piping body as used herein. Furthermore, it will be understood that piping components that are made as a single piece or constructed with a number of parts may be fabricated using the disclosed low silicon copper alloys.

Figure 7:
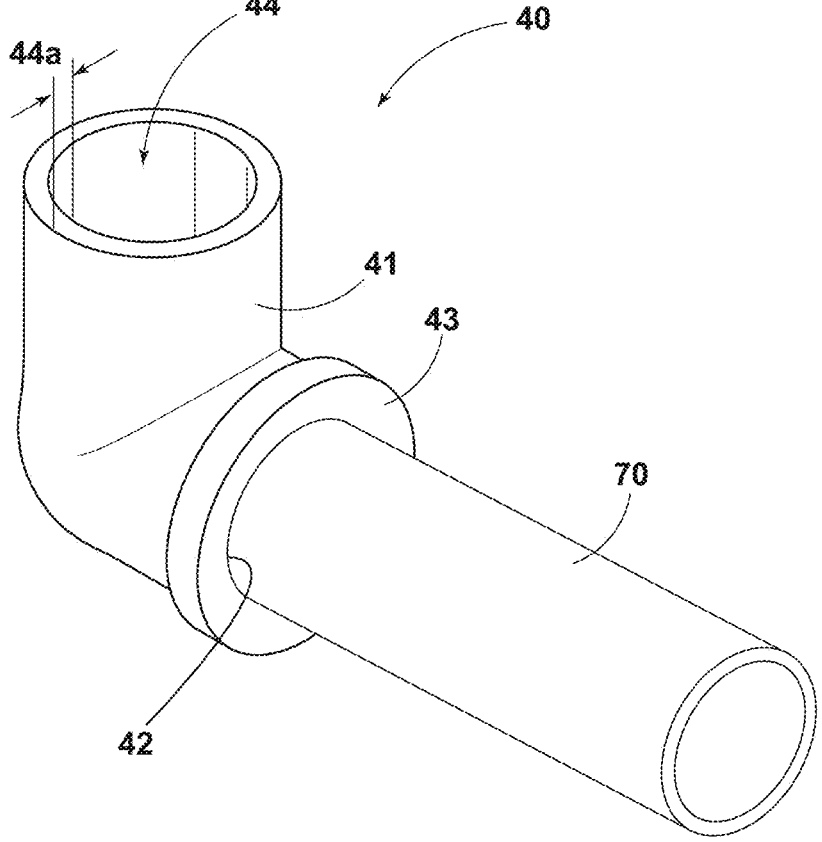
FIG. 7 is a perspective view of a piping component (e.g., an elbow fitting) joined to another piping component (e.g., a tube).

Referring now to FIG. 7, in embodiments an open end of the piping component (e.g., the inlet end 42 of the elbow fitting 40) is joined to another piping component 70. In embodiments, the open end of the piping component is joined to the other piping component 70 via a thermal joinery method, such as being welded, soldered, or brazed to the other piping component 70. In embodiments, the open end of the piping component is joined to the other piping component 70 via a mechanical deformation joinery method, such as compression, press, push, or slip connection joined to the other piping component 70.

In embodiments, the low silicon copper alloy described herein is cold worked and the piping component is formed from the cold worked alloy. Cold working an alloy entails deforming the alloy at a temperature below the recrystallization temperature of the alloy, such as at room temperature. An example cold working method is drawing, where a tube or bar of the alloy is pulled through a die that reduces the diameter and increases the length of the tube or bar. The cold working generally increases the strength and hardness of the alloy but decreases the ductility.

As further demonstrated in the following examples section, in embodiments, the cold worked alloy exhibits various strength, hardness, and ductility values, as a function of the deformation that occurred during cold working of the alloy. In embodiments, the cold worked alloy exhibits one or more of (i) an ultimate tensile strength within a range of 340 MPa to 550 MPa, (ii) a yield strength within a range of 275 MPa to 480 MPa, (iii) an elongation within a range of 20% to 30%, and (iv) a Rockwell B hardness value within a range of from 75 to 85. In embodiments, the cold worked alloy exhibits those properties after being formed from a drawing of the alloy as-cast resulting in a diameter reduction within a range of 10% to 25%, e.g., 14%.

In embodiments, the cold worked alloy exhibits one or more of (i) an ultimate tensile strength within a range of 550 MPa to 750 MPa, (ii) a yield strength within a range of 480 MPa to 655 MPa, (iii) an elongation within a range of 12% to 20%, and (iv) a Rockwell B hardness value within a range of 85 to 91. In embodiments, the cold worked alloy exhibits those properties after being formed from a drawing of the alloy as cast resulting in a diameter reduction within a range of 25% to 35%, e.g., 29%.

In embodiments, the cold worked alloy exhibits one or more of (i) an ultimate tensile strength within a range of from 750 MPa to 900 MPa, (ii) a yield strength within a range of 655 MPa to 830 MPa, (iii) an elongation within a range of 10% to 12%, and (iv) a Rockwell B hardness value within a range of 91 to 98. In embodiments, the cold worked alloy exhibits those properties after being formed from a drawing of the alloy as cast resulting in a diameter reduction within a range of 35% to 45%, e.g., 43%.

EXAMPLES

Examples of disclosed low silicon copper alloys as detailed in Table 1 above are discussed below, further denoted as "Ex. 1", "Ex. 2", etc. Some of these Examples are discussed in comparison to known alloys (e.g., C12200, C87500, C87600, and C87850), further denoted as "C.E. 1", "C.E. 2", "C.E. 3", and "C.E. 4". These known alloys are highlighted as comparative alloys in the sense that they are used for fabricating piping components with a specific fabrication method, a specific joinery method, and/or a specific service application. In contrast, the low silicon copper alloys of the disclosure can be employed to enable multiple piping component fabrication methods, multiple joinery methods, and/or multiple service applications.

The specific compositions of Examples 1-8 are listed in Table 2 below and are consistent with the composition shown in Table 1. In Table 2, where there is no value entered for the content of an element as indicated by "–", the indicated element was not measured for the example composition. Further, where the value for the content of an element is indicated by "T", less than 0.008% by weight, or only trace amounts, of the element was found for the example composition. It will be understood that these Examples 1-8 are exemplary of the low silicon copper alloys of the disclosure.

testing method detailed in the American Society for Testing and Materials (ASTM) E8 Standard Test Methods for Tension of Metallic Materials was used for four test specimens fabricated from the disclosed composition. The test specimens were each a cast 0.505 tensile bar, as required by the standard. The results of the testing are detailed below in Table 3. The tensile test results are comparable to known values for the mechanical properties as provided by the Copper Development Association (CDA) for various forms and tempers of C12200 alloys, which are also listed in Table 3.

TABLE 3

| Sample ID | Sample Desc. | Ultimate Tensile Strength ($N/mm^2$) | Yield Strength ($N/mm^2$) | Elonga-tion (%) |
|---|---|---|---|---|
| Ex. 1 | Pour 1 - Sample 1 | 287 | 96 | 37.9 |
| Ex. 1 | Pour 1 - Sample 2 | 290 | 112 | 45.6 |
| Ex. 1 | Pour 2 - Sample 1 | 268 | 111 | 33.0 |
| Ex. 1 | Pour 2 - Sample 2 | 245 | 111 | 25.4 |
| | Average | 273 | 108 | 35.5 |
| C12200 | Hard Drawn | 379 | 345 | 8.0 |
| C12200 | Light Drawn | 276 | 221 | 25.0 |
| C12200 | Soft Grain 0.025 mm | 234 | 76 | 45.0 |
| C12200 | Soft Grain 0.050 mm | 221 | 69 | 45.0 |

As denoted in Table 2, C12200 alloys include a minimum of 99.9% copper by weight, while the Ex. 1 composition maintains about 83% copper by weight. Further, C12200 alloys do not include zinc, silicon, or any of the other elements included in the disclosed composition. The mechanical properties provided by the high copper content of C12200 alloys make these alloys the ideal alloys for fabricating piping components for use with press connections. Particularly, light drawn piping components and soft grain piping components are currently preferred for these press connections based on their ideal mechanical properties while copper tubing to be received by press fittings may be formed of hard drawn C12200 alloys.

TABLE 2

| | Alloy Composition (% by weight) | | | | | | | | | | | |
|---|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | C.E.1 | C.E. 2 | C.E. 3 | C.E. 4 |
| Cu | 83.34 | 84.26 | 83.88 | 84.5 | 85.26 | 85.49 | 84.18 | 85.87 | 99.9 min | 79.0 min | 88.0 min | 74-78 |
| Zn | 15.55 | 15.07 | 15.06 | 14.26 | 13.88 | 12.62 | 15.15 | 12.67 | — | 12-16 | 4-7 | remainder |
| Si | 1.020 | 0.517 | 0.888 | 1.050 | 0.749 | 1.620 | 0.465 | 1.270 | — | 3-5 | 3.5-5.5 | 2.7-3.4 |
| P | 0.026 | T | T | 0.087 | T | T | — | — | — | — | — | 0.05-0.20 |
| Fe | 0.028 | 0.15 | 0.147 | 0.019 | 0.054 | 0.183 | 0.172 | 0.141 | — | — | 0.20 max | 0.10 max |
| As | — | T | T | T | T | T | T | — | — | — | — | — |
| Sb | — | T | T | T | T | T | T | — | — | — | — | — |
| Pb | 0.008 | T | T | T | 0.010 | 0.011 | T | — | — | 0.09 max | 0.09 max | 0.09 max |
| Al | — | T | T | T | T | T | T | — | — | — | — | — |
| Sn | 0.010 | T | T | T | 0.020 | 0.019 | T | — | — | — | — | 0.30 max |
| Mn | — | T | T | T | T | T | T | — | — | — | — | — |
| Ni | — | T | T | T | T | T | T | — | — | — | — | — |

Example 1

One example of a low silicon copper alloy (Ex. 1) includes about 83% copper, about 16% zinc, about 1% silicon, about 0.03% phosphorous, about 0.03% iron, about 0.01% tin, and about 0.01% lead (by weight). A tensile As detailed in Table 3 above, the mechanical properties exhibited by the test specimens of Ex. 1 are comparable to the mechanical properties of the ideal C12200 alloys for press fittings. Particularly, the average yield strength exhibited by the test specimens of Ex. 1 (about 108 $N/mm^2$) is comparable to the yield strength exhibited by C12200 alloys (between 69 N/mm² and 221 N/mm²) as reported by the CDA. The average ultimate tensile strength of the test specimens of Ex. 1 (about 273 N/mm²) is also comparable to the ultimate tensile strength of C12200 alloys (between 221 N/mm² and 276 N/mm²), and the average ductility of the test specimens of Ex. 1, as measured in percent elongation (about 35.5%), is favorably high and comparable to the ductility of C12200 alloys (between about 25.0% and 45.0%). Thus, Ex. 1 exhibited mechanical properties within the range of ideal mechanical properties for piping components to be used for mechanical deformation joinery processes like press connections as evidenced by the comparison between the ideal mechanical properties of the currently preferred C12200 alloys and the mechanical properties exhibited by the test specimens of Ex. 1.

Example 2

Another exemplary composition of the disclosed low silicon copper alloys (Ex. 2) includes about 84% copper, about 15% zinc, about 0.5% silicon, about 0.15% iron, and less than about 0.008% of one or more of phosphorus, arsenic, antimony, lead, aluminum, tin, manganese, and nickel (by weight). Like with Ex. 1, a tensile testing method detailed in the ASTM E8 Standard Test Methods for Tension of Metallic Materials was used for multiple specimens fabricated from Ex. 2. The test specimens were each a cast 0.505 tensile bar, as required by the standard. The average values of the tensile test results are detailed below in Table 4. The average values of the tensile test results are comparable to known values for the mechanical properties as provided by the CDA for various forms and tempers of C12200 alloys, which are also listed in Table 4.

TABLE 4

| Sample ID | Sample Desc. | Ultimate Tensile Strength (N/mm²) | Yield Strength (N/mm²) | Elongation (%) |
|---|---|---|---|---|
| Ex. 2 | — | 278.3 | 84.3 | 57.0 |
| C12200 | Hard Drawn | 379.0 | 345.0 | 8.0 |
| C12200 | Light Drawn | 276.0 | 221.0 | 25.0 |
| C12200 | Soft Grain 0.025 mm | 234.0 | 76.0 | 45.0 |
| C12200 | Soft Grain 0.050 mm | 221.0 | 69.0 | 45.0 |

As detailed in Table 4 above, like the test specimens of Ex. 1, the test specimens of Ex. 2 exhibited mechanical properties that are comparable to the mechanical properties exhibited by the ideal C12200 alloys for press fittings, as discussed above. Particularly, the average yield strength of the test specimens of Ex. 2 (about 84 N/mm²) is comparable to the yield strength of C12200 alloys (between 69 N/mm² and 221 N/mm²). The average ultimate tensile strength of the test specimens of Ex. 2 (about 278 N/mm²) is also comparable to the ultimate tensile strength of C12200 alloys (between 221 N/mm² and 276 N/mm²), and the average ductility of the test specimens of Ex. 2, as measured in percent elongation, (about 57.0%) is favorably high compared to the ductility exhibited by C12200 alloys (between about 25.0% and 45.0%). Thus, like the test specimens of Ex. 1, the test specimens of Ex. 2 exhibit mechanical properties within the range of ideal mechanical properties for piping components to be used for mechanical deformation joinery processes like press connections as evidenced by the comparison between the ideal mechanical properties of the currently preferred C12200 alloys and the mechanical properties exhibited by the test specimens of Ex. 2. Additionally, the range of values for tensile strength between the test specimens of Ex. 1 and the test specimens of Ex. 2 is between about 83 N/mm² and about 112 N/mm², indicating that exemplary compositions of the disclosed alloys exhibit a smaller range of yield strengths, ensuring more narrow and predictable strengths than those exhibited by various forms of C12200 alloys. This increases the suitability of the disclosed alloys for use in at least press fittings.

A dezincification (DZ) corrosion test was also performed on a specimen of Ex. 2 in conjunction with specimens having sample compositions according to C87500 alloys and C87600 alloys and a specimen of an alloy ("Moderate Silicon") having a composition including a silicon content less than the content of C87500 and C87600 but greater than the silicon content of the disclosed alloys. C87500 and C87600 are high silicon alloys often used for fabricating piping components as the high silicon content of these alloys (3% to 5% by weight and 3.5% and 5.5% by weight, respectively, as provided by the CDA) are thought to inhibit corrosion. However, the high silicon contents of C87500 and C87600 also results in higher mechanical strengths that may impede use of the high-silicon alloys with deformation joinery methods like press fitting.

The compositions of the tested specimens are laid out below in Table 5. It should be noted that the trace elements of Ex. 2, as detailed in Table 2, such as phosphorous, arsenic, antimony, lead, aluminum, tin, manganese, and nickel, were not included in Table 5 below for clarity. The test was conducted in accordance with ISO 6509 testing method. Results for the testing of the specimens are also provided in Table 5.

TABLE 5

| | Alloy Composition (% by weight) | | | |
|---|---|---|---|---|
| Element | C 87500 | C 87600 | Moderate Silicon | Ex. 2 |
| Cu | 81.22 | 88.45 | 80.75 | 84.26 |
| Zn | 15.07 | 6.49 | 16.13 | 15.07 |
| Si | 3.560 | 4.870 | 2.890 | 0.517 |
| Fe | 0.047 | 0.165 | 0.146 | 0.150 |
| DZ Corrosion Penetration (μm) | 92 | 0 | 37 | 41 |

Acceptance criteria for the DZ corrosion penetration depth under the ISO 6509 testing method is less than 200 μm. As detailed in Table 5, the specimen of Ex. 2 yielded a DZ corrosion penetration depth of about 41 μm while the specimen of the C87500 and C87600 alloys yielded a DZ corrosion penetration depth of 92 μm and 0 μm, respectively. The specimen of the Moderate Silicon alloy yielded a DZ corrosion penetration depth of 37 μm. Though the silicon content of Ex. 2 is significantly lower than the silicon contents of the C87500 and C87600 compositions, there was not a substantial increase in the corrosion penetration depth between the specimens of the high silicon alloys and the specimen of Ex. 2. Further, there was not a substantial increase in the corrosion penetration depth of the specimen of Ex. 2 as compared to the Moderate Silicon alloy. These results indicate that the lower silicon content of Ex. 2, as compared to the high-silicon alloys C87500 and C87600 and the Moderate Silicon alloy, does not negatively affect the ability of Ex. 2 to maintain a resistance to dezincification that is comparable to the currently preferred alloys having high silicon contents.

The results were surprising. The common thought was the higher the silicon content in the alloy, the higher the corrosion resistance of the alloy would be. It was surprising that the alloy of Example 2, including 0.517 wt % silicon, passed the ISO 6509 test with a DZ corrosion penetration depth of only 41 μm, beating the 92 μm DZ corrosion penetration depth for alloy C87500, which includes nearly 7 times the weight percentage of silicon than Example 2 at 3.560 wt % silicon.

Example 3

Another exemplary composition of the disclosed low silicon copper alloys (Ex. 3) includes about 84% copper, about 14% zinc, about 0.9% silicon, about 0.15% iron, and less than about 0.008% of one or more of phosphorus, arsenic, antimony, lead, aluminum, tin, manganese, and nickel (by weight). Like with Ex. 1 and Ex. 2, a tensile testing method detailed in the ASTM E8 Standard Test Methods for Tension of Metallic Materials was used for multiple specimens fabricated from Ex. 3. The test specimens were each a cast 0.505 tensile bar, as required by the standard. The average values of the tensile test results are detailed below in Table 6. The average values of the tensile test results are comparable to known values for the mechanical properties as provided by the CDA for various forms and tempers of C12200 alloys, which are also listed in Table 6.

TABLE 6

| Sample ID | Sample Desc. | Ultimate Tensile Strength (N/mm$^2$) | Yield Strength (N/mm$^2$) | Elongation (%) |
|---|---|---|---|---|
| Ex. 3 | — | 275.5 | 83.8 | 57.0 |
| C12200 | Hard Drawn | 379.0 | 345.0 | 8.0 |
| C12200 | Light Drawn | 276.0 | 221.0 | 25.0 |
| C12200 | Soft Grain 0.025 mm | 234.0 | 76.0 | 45.0 |
| C12200 | Soft Grain 0.050 mm | 221.0 | 69.0 | 45.0 |

As detailed in Table 6 above, like the test specimens of Ex. 1 and Ex. 2, the test specimens of Ex. 3 exhibited mechanical properties that are comparable to the mechanical properties of the ideal C12200 alloys for press fittings, as discussed above. Particularly, the average yield strength of the test specimens of Ex. 3 (about 84 N/mm$^2$) is comparable to the yield strength of C12200 alloys (between 69 N/mm$^2$ and 221 N/mm$^2$). The average ultimate tensile strength of the test specimens of Ex. 3 (about 276 N/mm$^2$) is also comparable to the ultimate tensile strength of C12200 alloys (between 221 N/mm$^2$ and 276 N/mm$^2$), and the average ductility of the test specimens of Ex. 3, as measured in percent elongation, (about 57%) is favorably high compared to the ductility of C12200 alloys (between about 25.0% and 45%). Thus, like the test specimens of Ex. 1 and Ex. 2, the test specimens of Ex. 3 exhibited mechanical properties within the range of ideal mechanical properties for piping components to be used for mechanical deformation joinery processes like press connections as evidenced by the comparison between the ideal mechanical properties of the currently preferred C12200 alloys and the mechanical properties exhibited by the test specimens of Ex. 3. Additionally, the average yield strength of the test specimens of Ex. 3 remains within the previously discussed range of values (i.e., 83 N/mm$^2$ to 112 N/mm$^2$), further indicating that exemplary compositions of the disclosed alloys yield more narrow and predictable ranges of yield strength as compared to C12200 alloys. This increases the suitability of the disclosed alloys in at least press fittings.

Example 4

Another exemplary composition of the disclosed low silicon copper alloys (Ex. 4) includes about 85% copper, about 14% zinc, about 1.1% silicon, about 0.09% phosphorous, about 0.02% iron, and less than about 0.008% of one or more of arsenic, antimony, lead, aluminum, tin, manganese, and nickel (by weight). Like with Ex. 1, Ex. 2, and Ex. 3, a tensile testing method detailed in the ASTM E8 Standard Test Methods for Tension of Metallic Materials was used for multiple specimens fabricated from Ex. 4. The test specimens were each a cast 0.505 tensile bar, as required by the standard. The average values of the tensile test results are detailed below in Table 7. The average values of the tensile test results are comparable to known values for the mechanical properties as provided by the CDA for various forms and tempers of C12200 alloys, which are also listed in Table 7.

TABLE 7

| Sample ID | Sample Desc. | Ultimate Tensile Strength (N/mm$^2$) | Yield Strength (N/mm$^2$) | Elongation (%) |
|---|---|---|---|---|
| Ex. 4 | — | 272.3 | 107.3 | 35.5 |
| C12200 | Hard Drawn | 379.0 | 345.0 | 8.0 |
| C12200 | Light Drawn | 276.0 | 221.0 | 25.0 |
| C12200 | Soft Grain 0.025 mm | 234.0 | 76.0 | 45.0 |
| C12200 | Soft Grain 0.050 mm | 221.0 | 69.0 | 45.0 |

As detailed in Table 7 above, like the test specimens of Ex. 1, Ex. 2, and Ex. 3, the test specimens of Ex. 4 exhibited mechanical properties that are comparable to the mechanical properties of the ideal C12200 alloys for press fittings, as discussed above. Particularly, the average yield strength of the test specimens of Ex. 4 (about 84 N/mm$^2$) is comparable to the yield strength of C 12200 alloys (between 69 N/mm$^2$ and 221 N/mm$^2$). The average ultimate tensile strength of the test specimens of Ex. 4 (about 276 N/mm$^2$) is also comparable to the ultimate tensile strength of C12200 alloys (between 221 N/mm$^2$ and 276 N/mm$^2$), and the average ductility of the test specimens of Ex. 4, as measured in percent elongation, (about 35.5%) is favorably high and comparable to the ductility of C12200 alloys (between about 25.0% and 45%). Thus, like the test specimens of Ex. 1, Ex. 2, and Ex. 3, the test specimens of Ex. 4 exhibited mechanical properties within the range of ideal mechanical properties for piping components to be used for mechanical deformation joinery processes like press connections as evidenced by the comparison between the ideal mechanical properties of the currently preferred C12200 alloys and the mechanical properties exhibited by the test specimens of Ex. 4. Additionally, the average yield strength of the test specimens of Ex. 4 remains within the previously discussed range of values (i.e., 83 N/mm$^2$ to 112 N/mm$^2$), further indicating that exemplary compositions of the disclosed alloys yield more narrow and predictable ranges of yield strength as compared to C12200 alloys, increasing the suitability of the disclosed alloys in at least press fittings.

Example 5

Another exemplary composition of the disclosed low silicon copper alloys (Ex. 5) includes about 85% copper, about 14% zinc, about 0.7% silicon, about 0.05% iron, about 0.01% lead, about 0.02% tin, and less than about 0.008% of one or more of phosphorus, arsenic, antimony, aluminum, manganese, and nickel (by weight). Like with Ex. 1, Ex. 2, Ex. 3, and Ex. 4, a tensile testing method detailed in the ASTM E8 Standard Test Methods for Tension of Metallic Materials was used for multiple specimens fabricated from Ex. 5. The test specimens were each a cast 0.505 tensile bar, as required by the standard. The average values of the tensile test results are detailed below in Table 8. The average values of the tensile test results are comparable to known values for the mechanical properties as provided by the CDA for various forms and tempers of C12200 alloys, which are also listed in Table 8.

TABLE 8

| Sample ID | Sample Desc. | Ultimate Tensile Strength (N/mm²) | Yield Strength (N/mm²) | Elongation (%) |
|---|---|---|---|---|
| Ex. 5 | — | 288.5 | 104.0 | 42.0 |
| C12200 | Hard Drawn | 379.0 | 345.0 | 8.0 |
| C12200 | Light Drawn | 276.0 | 221.0 | 25.0 |
| C12200 | Soft Grain 0.025 mm | 234.0 | 76.0 | 45.0 |
| C12200 | Soft Grain 0.050 mm | 221.0 | 69.0 | 45.0 |

As detailed in Table 8 above, like the test specimens of Ex. 1, Ex. 2, Ex. 3, and Ex. 4, the test specimens of Ex. 5 exhibited mechanical properties that are comparable to the mechanical properties of the ideal C12200 alloys for press fittings, as discussed above. Particularly, the average yield strength of the test specimens of Ex. 5 (about 104 N/mm²) is comparable to the yield strength of C12200 alloys (between 69 N/mm² and 221 N/mm²). The average ultimate tensile strength of the test specimens of Ex. 5 (about 289 N/mm²) is also comparable to the ultimate tensile strength of C 12200 alloys (between 221 N/mm² and 276 N/mm²), and the average ductility of the test specimens of Ex. 5, as measured in percent elongation, (about 42%) is favorably high and comparable to the ductility of C12200 alloys (between about 25.0% and 45%). Thus, like the test specimens of Ex. 1, Ex. 2, Ex. 3, and Ex. 4, the test specimens of Ex. 5 exhibited mechanical properties within the range of ideal mechanical properties for piping components to be used for mechanical deformation joinery processes like press connections as evidenced by the comparison between the ideal mechanical properties of the currently preferred C12200 alloys and the mechanical properties of the test specimens of Ex. 5. Additionally, the average yield strength of the test specimens of Ex. 5 remains within the previously discussed range of values (i.e., 83 N/mm² to 112 N/mm²), further indicating that exemplary compositions of the disclosed alloys yield more narrow and predictable ranges of yield strength as compared to C12200 alloys, increasing the suitability of the disclosed alloys in at least press fittings.

A thermal conductivity evaluation was also conducted on a sample made from Ex. 5 in conjunction with the testing of samples made of exemplary C87500 and C87600 alloys. The samples were evaluated using a C-Therm TCi Thermal Conductivity analyzer. More particularly, three specimens were tested using a Modified Transient Plane Source sensor with the C-Therm TCi Thermal Conductivity Analyzer in accordance with ASTM D7984-16 testing method. Table 9 below lists the known average thermal conductivity of high silicon alloys C87500, C87600, and C87850, as provided by the CDA, as well as the results of testing samples of the exemplary C87500 and C87600 alloys with a resulting average. Table 9 further lists the results of the testing performed on specimens of Ex. 5 with a resulting average.

TABLE 9

| | Thermal Conductivity, k (W/m · K) | | | | | |
|---|---|---|---|---|---|---|
| | C87500 CDA | C87600 CDA | C87850 CDA | C87500 Tested | C87500 Tested | Ex. 5 |
| Test 1 | N/A | N/A | N/A | 24.9 | 30.2 | 34.5 |
| Test 2 | N/A | N/A | N/A | 25.1 | 30.2 | 34.8 |
| Test 3 | N/A | N/A | N/A | 25.0 | 30.0 | 34.7 |
| Average | 27.69 | 28.38 | 37.73 | 25.0 | 30.1 | 34.6 |

The high silicon alloys (e.g., C87500, C87600, and C87850) are commonly used for brazing and soldering due to the high thermal conductivity of the high silicon alloys. As compared to the high silicon alloys, both as reported by the CDA and as tested with the test specimens of Ex. 5, the test specimens of Ex. 5 demonstrated an increase in overall average thermal conductivity (k) value over all three high silicon alloys. This high thermal conductivity (k) value of about 35 W/m·K presents Ex. 5 as a better or equally good option for fabricating piping components (e.g., the valve assembly 10, the elbow fitting 40, and/or the coupler 60) for use with soldering as compared to the commonly soldered high silicon alloys. Further, as described above, tensile testing of the test specimens of Ex. 5 indicates that the same alloy (Ex. 5) exhibited the necessary ductility and mechanical strengths to be used to fabricate press fittings. This indicates further that the disclosed alloys are suitable for multiple fabrication methods for forming piping components that may be used with multiple joinery methods and/or service applications.

Example 6

Another exemplary composition of the disclosed low silicon copper alloy (Ex. 6) includes about 85% copper, about 13% zinc, about 1.05% silicon, about 0.18% iron, about 0.01% lead, about 0.02 tin, and less than about 0.008% of one or more of phosphorus, arsenic, antimony, aluminum, manganese, and nickel (by weight). Like with Ex. 1, Ex. 2, Ex. 3, Ex. 4, and Ex. 5, a tensile testing method detailed in the ASTM E8 Standard Test Methods for Tension of Metallic Materials was used for multiple specimens fabricated from Ex. 6. The test specimens were each a cast 0.505 tensile bar, as required by the standard. The average values of the tensile test results are detailed below in Table 10. The average values of the tensile test results are comparable to known values for the mechanical properties as provided by the CDA for various forms and tempers of C12200 alloys, which are also listed in Table 10.

TABLE 10

| Sample ID | Sample Desc. | Ultimate Tensile Strength (N/mm²) | Yield Strength (N/mm²) | Elongation (%) |
|---|---|---|---|---|
| Ex. 6 | — | 338.7 | 89.8 | 65.3 |
| C12200 | Hard Drawn | 379.0 | 345.0 | 8.0 |
| C12200 | Light Drawn | 276.0 | 221.0 | 25.0 |
| C12200 | Soft Grain 0.025 mm | 234.0 | 76.0 | 45.0 |
| C12200 | Soft Grain 0.050 mm | 221.0 | 69.0 | 45.0 |

As detailed in Table 10 above, like the test specimens of Ex. 1, Ex. 2, Ex. 3, Ex. 4, and Ex. 5, the test specimens of Ex. 6 exhibited mechanical properties that are comparable to the mechanical properties of the ideal C12200 alloys for press fittings, as discussed above. Particularly, the average yield strength of the test specimens of Ex. 6 (about 90 N/mm$^2$) is comparable to the yield strength of C12200 alloys (between 69 N/mm$^2$ and 221 N/mm$^2$). The average ultimate tensile strength of the test specimens of Ex. 6 (about 339 N/mm$^2$) is higher than the ultimate tensile strength of C12200 alloys (between 221 N/mm$^2$ and 276 N/mm$^2$), and the average ductility of the test specimens of Ex. 6, as measured in percent elongation, (about 65%) is favorably high compared to the ductility of C12200 alloys (between about 25.0% and 45%). Thus, like the test specimens of Ex. 1, Ex. 2, Ex. 3, Ex. 4, and Ex. 5, the test specimens of Ex. 6 exhibited mechanical properties within the range of ideal mechanical properties for piping components to be used for mechanical deformation joinery processes, like press connections, as evidenced by the comparison between the ideal mechanical properties of the currently preferred C12200 alloys and the mechanical properties exhibited by the test specimens of Ex. 6. Additionally, the average yield strength of the test specimens of Ex. 6 remained within the previously discussed range of values (i.e., 83 N/mm$^2$ to 112 N/mm$^2$), further indicating that exemplary compositions of the disclosed alloys yield more narrow and predictable ranges of yield strength as compared to the broader range of yield strengths exhibited by C12200 alloys, increasing the suitability of the disclosed alloys in at least press fittings.

Like with Ex. 5, a thermal conductivity evaluation was also conducted on samples made from Ex. 6. Specifically, a specimen was tested using a Modified Transient Plane Source sensor with the C-Therm TCi Thermal Conductivity Analyzer in accordance with ASTM D7984-16 testing method.

Table 11 below lists the known average thermal conductivity of high silicon alloys C87500, C87600, and C87850 as provided by the CDA. Table 11 also lists the results of testing samples of the exemplary C87500 and C87600 alloys tested in conjunction with the test specimens of Ex. 5, as discussed above, and further lists a resulting average of the results. Table 11 further lists the results of the testing performed on the test specimen of Ex. 6 with a resulting average.

TABLE 11

| | Thermal Conductivity, k (W/m · K) | | | | | |
|---|---|---|---|---|---|---|
| Element | C87500 CDA | C87600 CDA | C87850 CDA | C87500 Tested | C87500 Tested | Ex. 6 |
| Test 1 | N/A | N/A | N/A | 24.9 | 30.2 | 50.5 |
| Test 2 | N/A | N/A | N/A | 25.1 | 30.2 | 51.6 |
| Test 3 | N/A | N/A | N/A | 25.0 | 30.0 | 50.6 |
| Average | 27.69 | 28.38 | 37.73 | 25.0 | 30.1 | 50.9 |

As discussed previously, the high silicon alloys (e.g., C87500, C87600, and C87850) are commonly used for brazing and soldering due to the high thermal conductivity of the high silicon alloys. As compared to the high silicon alloys, both as reported by the CDA and with the test specimens of Ex. 5, the test specimens of Ex. 6 demonstrated an increase in overall average thermal conductivity (k) value over all three high silicon alloys. This higher thermal conductivity (k) value of about 51 W/m·K presents Ex. 6 as a better option for fabricating piping components (e.g., the valve assembly 10, the elbow fitting 40, and/or the coupler 60) for use with soldering as compared to the commonly soldered high silicon alloys. It is further notable that Ex. 6 includes a silicon content (1.62% by weight) on the higher end of the specified range for silicon content (e.g., 0.265% to 2.0% by weight) for the disclosed alloys. With this silicon content, the test specimens of Ex. 6 exhibited an average thermal conductivity (k) value that is notably higher than the thermal conductivity (k) values of the high silicon alloys, both provided by the CDA and tested, while still maintaining the necessary ductility and mechanical strengths to be used to fabricate press fittings. This indicates further that the disclosed alloys are suitable for multiple fabrication methods for forming piping components that may be used with multiple joinery methods and/or service applications.

Without being bound by theory, it is believed that the inclusion of over 2.0 wt % silicon (such as in C87500, C87600, and C87850) comes at the expense of a decrease in thermal conductivity, which renders the silicon brass alloys less optimal when the connections are made via thermal methods such as soldering. It is believed that the silicon in these commercially available alloys segregates out from the matrix of the alloy solution. Such segregation of the silicon from the matrix of the alloy solution not only negatively affects the thermal conductivity—it additionally negatively affects the mechanical properties of the alloy, such as ultimate tensile strength and yield strength, in a manner that makes the alloys less suitable for mechanical deformation joinery. Further, without being bound by theory, the smaller weight percentages of silicon in the alloys of the present disclosure prevents the transformation of the silicon-rich segregate phase into a layer of surface silicon oxide, a barrier to the effectiveness of many fluxes used for soldering.

Example 7

Another exemplary composition of the disclosed low silicon copper alloy (Ex. 7) includes about 84% copper, about 15% zinc, about 0.5% silicon, about 0.5% iron, about 0.1% lead, and less than about 0.008% of one or more of phosphorus, arsenic, antimony, aluminum, tin, manganese, and nickel (by weight). Like Examples 5 and 6, a thermal conductivity evaluation was also conducted on samples made from the composition of Example 7 using a Modified Transient Plane Source sensor with the C-Therm TCi Thermal Conductivity Analyzer in accordance with ASTM D7984-16 testing method.

Table 12 below lists the known average thermal conductivity of high silicon alloys C87500, C87600, and C87850 as provided by the CDA. Table 12 also lists the results of testing samples of the exemplary C87500 and C87600 alloys tested in conjunction with the test specimens of Ex. 5, as discussed above, and further lists a resulting average of the results. Table 12 further lists the results of the testing performed on the test specimen of Ex. 7 with a resulting average.

TABLE 12

| | Thermal Conductivity, k (W/m · K) | | | | | |
|---|---|---|---|---|---|---|
| Element | C87500 CDA | C87600 CDA | C87850 CDA | C87500 Tested | C87500 Tested | Ex. 7 |
| Test 1 | N/A | N/A | N/A | 24.9 | 30.2 | 66.4 |
| Test 2 | N/A | N/A | N/A | 25.1 | 30.2 | 66.9 |
| Test 3 | N/A | N/A | N/A | 25.0 | 30.0 | 66.5 |
| Average | 27.69 | 28.38 | 37.73 | 25.0 | 30.1 | 66.6 |

As discussed previously, the high silicon alloys (e.g., C87500, C87600, and C87850) are commonly used for brazing and soldering due to the high thermal conductivity of the high silicon alloys. The test specimens of Ex. 7, like those of Ex. 5 and Ex. 6, demonstrated an increase in overall average thermal conductivity (k) value over all three high silicon alloys, both compared to the values provided by the CDA and compared to the values recorded during testing in conjunction with the test specimens of Ex. 5. This high thermal conductivity (k) value of about 67 W/m·K presents Ex. 7 as a better option for fabricating piping components (e.g., the valve assembly 10, the elbow fitting 40, and/or the coupler 60) for use with soldering as compared to the commonly soldered high silicon alloys.

Example 8

Another exemplary composition of the disclosed low silicon copper alloys (Ex. 8) includes about 86% copper, about 13% zinc, about 1.3% silicon, and about 0.14% iron. Trace elements of one or more of phosphorus, arsenic, antimony, aluminum, tin, manganese, and nickel may also be included. Like with Ex. 2, a dezincification (DZ) corrosion test was performed on a specimen of Ex. 8 in conjunction with the testing of the specimens having sample compositions according to C87500 alloys and C87600 alloys and a specimen of an alloy ("Moderate Silicon") having a composition including a silicon content less than the content of C87500 and C87600 but greater than the silicon content of the disclosed alloys. As discussed with respect to Ex. 2, C87500 and C87600 are high silicon alloys often used for fabricating piping components as the high silicon content of these alloys (3% to 5% by weight and 3.5% and 5.5% by weight, respectively, as provided by the CDA) are thought to inhibit corrosion. However, the high silicon contents of C87500 and C87600 alloys also results in higher mechanical strengths that may impede use of the high-silicon alloys with mechanical deformation joinery methods like press fitting.

The compositions of the tested specimens are laid out below in Table 13. It should be noted that the trace elements of Ex. 9, as detailed in Table 2, such as phosphorus, arsenic, antimony, lead, aluminum, tin, manganese, and nickel, were not included in Table 13 below for clarity. The test was conducted in accordance with ISO 6509 testing method. Results for the testing of the specimens are also provided in Table 13.

TABLE 13

| Alloy Composition (% by weight) | | | | |
|---|---|---|---|---|
| Element | C87500 | C87600 | Moderate Silicon | Example 8 |
| Cu | 81.22 | 88.45 | 80.75 | 85.87 |
| Zn | 15.07 | 6.49 | 16.13 | 12.67 |
| Si | 3.560 | 4.870 | 2.890 | 1.270 |
| Fe | 0.047 | 0.165 | 0.146 | 0.141 |
| DZ Corrosion Penetration (μm) | 92 | 0 | 37 | 53 |

Acceptance criteria for the DZ corrosion penetration depth under the ISO 6509 testing method is less than 200 μm. As detailed in Table 13, the specimen of Ex. 8 yielded a DZ corrosion penetration depth of about 53 μm while the C87500 and C87600 alloys yielded a DZ corrosion penetration depth of 92 μm and 0 μm, respectively. The Moderate Silicon alloy yielded a DZ corrosion penetration depth of 37 μm. Like with Ex. 2 above, though the silicon content of Ex.

8 is significantly lower than the silicon contents of the C87500 and C87600 alloys, there was not a substantial increase in the corrosion penetration depth between the tested specimens of the high silicon alloys and the tested specimen of Ex. 8. Further, there was not a substantial increase in the corrosion penetration depth of the tested specimen of Ex. 8 as compared to the tested specimen of the Moderate Silicon alloy. These results indicate that the lower silicon content of Ex. 8, as compared to the high-silicon alloys C87500 and C87600 and the Moderate Silicon alloy, does not negatively affect the ability of Ex. 8 to maintain the a resistance to dezincification that is comparable to the currently preferred alloys having high silicon contents.

Example 9

For Example 9, a low silicon copper alloy of the present disclosure was prepared. Specifically, the alloy had a composition comprising (by weight percentage) 83.26% copper, 15.73% zinc, and 0.95% silicon. The total weight percentage of copper, zinc, and silicon was thus 99.94%. The alloy was cast as a bar having a diameter of 0.875 inch. Samples of the bar were then formed to be subjected to cold working and testing. One sample was not cold worked. One sample was cold worked to reduce the diameter of the sample to 0.75 inch, a 14% reduction in diameter. Another sample was cold worked to reduce the diameter of the sample to 0.625 inch, a 29% reduction in diameter. Another sample was cold worked to reduce the diameter of the sample to 0.5 inch, a 43% reduction in diameter. Each sample was then tested for ultimate tensile strength, yield strength, and elongation according to the methods detailed in the ASTM E8 Standard Test Methods for Tension of Metallic Materials. In addition, the Rockwell B hardness value (unit-less) and the Rockwell 30T hardness value (unit-less) were determined for each sample according to the method detailed in ASTM E18-20, titled Standard Test Methods for Rockwell Hardness of Metallic Materials. The results of the testing are set forth in Table 14 below.

TABLE 14

| | As cast (0.875") | 14% reduction (0.75") | 29% reduction (0.625") | 14% reduction (0.5") |
|---|---|---|---|---|
| Ultimate Tensile Strength (MPa/ksi) | 285/41.4 | 389/56.4 | 607/88.1 | 827/120 |
| Yield Strength (MPa/ksi) | 140/20.3 | 323/46.8 | 581/84.2 | 772/112 |
| Elongation (%) | 57.5 | 25.1 | 15.6 | 11.6 |
| Hardness - Rockwell B | 15 | 81 | 87 | 97 |
| Hardness - Rockwell 30T | 21 | 69 | 77 | 79 |

Analysis of the results set forth in Table 14 reveal that cold working the alloy increases the ultimate tensile strength, the yield strength, and the hardness of the alloy relative to the alloy as cast. However, cold working the alloy decreases the elongation of the alloy relative to the alloy as cast. The increased strength and hardness of the alloy renders the cold worked alloy more suitable for some applications for which the alloy, as-cast, would be less suitable. For example, the cold worked alloy would be suitable for piping components used in vehicles where the piping components would encounter mechanical stress.

Example 10

For Example 10, samples were cut from the 0.875 inch as-cast alloy bar described in Example 9 above and cold worked via compression until the slugs expanded by 42% to have a diameter of 1.25 inches. Each sample was then machined into 0.625 inch inner-diameter cups (e.g., a first end was open and a second end was closed). Each cup was then pressed onto an end of a 0.625 inch outer diameter copper tube having one of three available wall thicknesses. The copper tubes having a wall thickness of 0.049" are referred to in Table 15 below as "Type K." The copper tubes having a wall thickness of 0.040" are referred to in Table 15 below as "Type L." The copper tubes having a wall thickness of 0.028" are referred to in Table 15 below as "Type M." Each copper tube with the pressed cup of the cold worked alloy was then subjected to a hydrostatic proof test and a hydrostatic burst test, with the other end of each copper tube was attached to a source of water under pressure, according to the test method of ASTM F1387 titled Standard Specification for Performance of Piping and Tubing Mechanically Attached Fittings. For the hydrostatic proof test, water is applied under pressure through the copper tubing with the cup pressed thereupon for a period of time. The distance, if any, that the cup moved during the period of time is then measured. For the hydrostatic burst test, water is applied under sequentially increasing pressure through the copper tubing with the cup pressed thereupon, until there is failure. The pressure at which failure occurred is then recorded. Saltwater was sprayed onto the cup and copper tube where the joining occurs, for several of the samples, and left in that sprayed state for 10 days before the testing was conducted. All testing occurred at room temperature. The results are set forth in Table 15 below.

TABLE 15

| Salt Spray | Copper Tubing Type | 1 Hour Slip (inches) | Burst Pressure (psi) |
|---|---|---|---|
| No | K | 0.001 | 3329 |
| No | K | 0.000 | 3517 |
| No | K | 0.001 | 3578 |
| No | M | 0.000 | 3823 |
| No | M | 0.000 | 3429 |
| No | M | 0.000 | 3697 |
| Yes | K | 0.001 | 2674 |
| Yes | M | 0.001 | 3439 |
| Yes | L | 0.001 | 3175 |
| Pass/Fail Standard | | <0.012 | |

Analysis of the results set forth in Table 15 reveals that the cold worked low silicon copper alloy can be well utilized as a piping component that is joined to another piping component through mechanical means such as compression, press, push, and slip connections. Although cold worked, the low silicon copper alloy retains sufficient malleability to form a robust mechanical connection over another piping component.

Example 11

For Example 11, alloys of several different compositions according to the present disclosure were formed. Several types of piping components were formed from the alloys, such as a valve body or a valve end piece. The DZ corrosion penetration depth under the ISO 6509 testing method was then determined, at several difference places on each piping component. The results are set forth in Table 16 below. Composition "a" refers to an alloy comprising (in weight percentage) 86.28% Cu, 12.56 Zn, and 0.897% Si. Composition "b" refers to an alloy comprising (in weight percentage) 82.96% Cu, 16.15 Zn, and 0.737% Si. Composition "c" refers to an alloy comprising (in weight percentage) 82.09% Cu, 16.1% Zn, and 0.832 Si.

TABLE 16

| Sample | Composition | Type | Location | Depth of Penetration ($\mu$m) |
|---|---|---|---|---|
| 1 | a | Body | Sidewall | 17 |
| 2 | a | Body | Cup | 12 |
| 3 | a | End Piece | Sidewall | 13 |
| 4 | a | End Piece | Cup | 7 |
| 5 | b | Body | Sidewall | 7 |
| 6 | b | Body | Cup | 7 |
| 7 | c | End Piece | Sidewall | 12 |
| 8 | c | End Piece | Cup | 9 |

Analysis of the results set forth in Table 16 reveals that all of the samples exhibited a DZ corrosion penetration depth of greater than 0 $\mu$m but less than 20 $\mu$m. That is so although all of the alloys tested incorporated less than 1% silicon (by weight).

Example 12

For Example 12, alloys of several different compositions according to the present disclosure were formed and samples prepared therefrom. The samples were then then tested for ultimate tensile strength, yield strength, and elongation according to the methods detailed in the ASTM E8 Standard Test Methods for Tension of Metallic Materials. The results are set forth in Table 17 below. Composition "a" refers to (in weight percentage) 87.41% copper, 12.14% zinc, 0.283% silicon, and 0.073% tin. Composition "b" refers to (in weight percentage) 82.96% copper, 16.15% zinc, and 0.737% silicon. Composition "c" refers to (in weight percentage) 82.99% copper, 16.1% zinc, and 0.832% silicon. Composition "d" refers to (in weight percentage) 86.29% copper, 12.37% zinc, and 1.22% silicon. Composition "e" refers to (in weight percentage) 82.13% copper, 15.98% zinc, and 1.62% silicon.

TABLE 17

| Sample | Composition | Ultimate Tensile Strength (MPa) | Yield Str. (MPa) | Elongation (%) |
|---|---|---|---|---|
| 1 | a | 218 | 62 | 62 |
| 2 | a | 224 | 68 | 68 |
| 3 | a | 233 | 66 | 66 |
| 4 | a | 237 | 67 | 67 |
| 5 | a | 235 | 60 | 60 |
| 6 | a | 199 | 63 | 63 |
| 7 | a | 243 | 68 | 68 |
| 8 | a | 236 | 67 | 67 |
| 9 | a | 241 | 65 | 65 |
| 10 | a | 229 | 68 | 68 |
| 11 | a | 233 | 65 | 65 |
| | AVERAGE | 230 | 65 | 59 |
| 12 | b | 279 | NA | 70 |
| 13 | b | 276 | NA | NA |
| | AVERAGE | 278 | NA | 70 |
| 14 | c | 277 | 111 | 54 |
| 15 | c | 279 | 114 | 67 |
| 16 | c | 275 | 115 | 69 |
| | AVERAGE | 277 | 113 | 63 |

TABLE 17-continued

| Sample | Composition | Ultimate Tensile Strength (MPa) | Yield Str. (MPa) | Elongation (%) |
|---|---|---|---|---|
| 17 | d | 313 | 72 | 73 |
| 18 | d | 314 | 89 | 66 |
| 19 | d | 308 | 73 | 71 |
| 20 | d | 311 | 72 | 67 |
| 21 | d | 308 | 70 | 75 |
| 22 | d | 307 | 71 | 75 |
| 23 | d | 315 | 76 | 70 |
| | AVERAGE | 309 | 76 | 69 |
| 24 | e | 320 | 93 | 57 |
| 25 | e | 274 | 88 | 30 |
| 26 | e | 328 | 89 | 64 |
| 27 | e | 296 | 85 | 56 |
| 28 | e | 320 | 92 | 57 |
| 29 | e | 304 | 84 | 60 |
| 30 | e | 312 | 84 | 63 |
| 31 | e | 345 | 106 | 66 |
| 32 | e | 339 | 107 | 53 |
| 33 | e | 337 | 101 | 60 |
| | AVERAGE | 318 | 93 | 57 |

Analysis of the results set forth in Table 17 reveals that alloys of the present disclosure can exhibit, as cast, an elongation of over 60%, such as within a range of from 60% to 70%.

What is claimed is:

1. A piping component comprising:

a piping body with an open end; and a cold worked and not subsequently annealed alloy comprising (by weight percentage) 12% to 16.5% zinc, 0.265% to 1.8% silicon and sufficient copper so that the sum of the weight percentages of the zinc, silicon, and copper in the alloy is at least 99.7%, wherein, the alloy exhibits a thermal conductivity of about 45 W/m·K to about 70 W/m·K, and wherein, at least one of the following conditions is met:

(a) the cold worked alloy was formed from a drawing of the alloy as-cast resulting in a diameter reduction within a range of 10% to 25%, and the cold worked alloy exhibits: (i) an ultimate tensile strength within a range of 340 MPa to 550 MPa, (ii) a yield strength within a range of 275 MPa to 480 MPa, and (iii) an elongation within a range of 20% to 30%, (b) the cold worked alloy was formed from a drawing of the alloy as-cast resulting in a diameter reduction within a range of 25% to 35%, and the cold worked alloy exhibits: (i) an ultimate tensile strength within a range of 550 MPa to 750 MPa, (ii) a yield strength within a range of 480 MPa to 655 MPa, and (iii) an elongation within a range of 12% to 20%, and (c) the cold worked alloy was formed from a drawing of the alloy as-cast resulting in a diameter reduction within a range of 35% to 45%, and the cold worked alloy exhibits: (i) an ultimate tensile strength within a range of 750 MPa to 900 MPa, (ii) a yield strength within a range of 655 MPa to 830 MPa, and (iii) an elongation within a range of 10% to 12%.

2. The piping component of claim 1, wherein the open end is joined to another piping component via welding, soldering, or brazing.

3. The piping component of claim 1, wherein the open end is joined to another piping component via compression, press, push, or slip connection.

4. The piping component of claim 1, wherein the cold worked alloy comprises (by weight percentage) 15.5% to 16.0% zinc, 0.75% to 1.15% silicon, and 83% to 84% copper.

5. The piping component of claim 1, wherein the cold worked alloy comprises (by weight percentage) greater than 15% zinc.

6. The piping component of claim 1, wherein the cold worked alloy exhibits:

a Rockwell B hardness value within a range of 75 to 85; and an elongation of 20% to 30%.

7. The piping component of claim 1, wherein the cold worked alloy exhibits:

a Rockwell B hardness value within a range of 85 to 91; and an elongation of 12% to 20%.

8. The piping component of claim 1, wherein the cold worked alloy exhibits:

a Rockwell B hardness value within a range of 91 to 98; and an elongation of 10% to 12%.

* * * * *